United States Patent
Roh et al.

(10) Patent No.: US 9,460,070 B2
(45) Date of Patent: Oct. 4, 2016

(54) MOBILE TERMINAL AND CORRESPONDING METHOD FOR TRANSMITTING MESSAGES WITH MEMOS WRITTEN THEREON

(71) Applicant: LG ELECTRONICS INC., Seoul (KR)

(72) Inventors: Hyeongseok Roh, Seoul (KR); Hyunghoon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 753 days.

(21) Appl. No.: 13/838,931

(22) Filed: Mar. 15, 2013

(65) Prior Publication Data

US 2013/0283144 A1    Oct. 24, 2013

(30) Foreign Application Priority Data

Apr. 20, 2012  (KR) .................. 10-2012-0041741

(51) Int. Cl.
| | | |
|---|---|---|
| G06F 17/00 | (2006.01) | |
| G06F 17/24 | (2006.01) | |
| G06F 3/0488 | (2013.01) | |
| G06F 3/0481 | (2013.01) | |
| H04M 1/725 | (2006.01) | |

(52) U.S. Cl.
CPC .......... G06F 17/241 (2013.01); G06F 3/0481 (2013.01); G06F 3/04883 (2013.01); H04M 1/72547 (2013.01); H04M 1/72544 (2013.01); H04M 2250/22 (2013.01)

(58) Field of Classification Search
CPC .......... G06F 17/241; G06F 17/30265; G06F 17/30867; G06F 17/24; G06F 17/30047; G06F 17/30268; G06F 17/00
See application file for complete search history.

(56) References Cited

U.S. PATENT DOCUMENTS

| | | | |
|---|---|---|---|
| 2008/0119235 A1* | 5/2008 | Nielsen ................ | G06F 3/0483 455/566 |
| 2012/0281020 A1 | 11/2012 | Yamamoto et al. | |
| 2012/0290591 A1* | 11/2012 | Flynn ................ | G06F 17/30247 707/754 |

FOREIGN PATENT DOCUMENTS

| | | |
|---|---|---|
| CN | 1798390 A | 7/2006 |
| WO | WO-2011/081088 A | 7/2011 |

OTHER PUBLICATIONS

Mike Melanson, "This Text Message Will Self Destruct in 60 seconds," ReadWrite, Feb. 11, 2011, pp. 1-6.*
Nancy Muir, "iPad™ for Seniors for Dummies®," for Dummies, Jul. 20, 2010, pp. 25-29.*
Ritchie, "AT&T iPhone MMS Arrives Today—Here's a Walkthrough!", iMore.com, XP-055072240, Sep. 25, 2009, 4 pages.

* cited by examiner

*Primary Examiner* — Ariel Mercado
(74) *Attorney, Agent, or Firm* — Birch, Stewart, Kolasch & Birch, LLP

(57) ABSTRACT

A mobile terminal and controlling method thereof are disclosed, which facilitates a terminal to be used in further consideration of user's convenience. The present invention includes a touchscreen, a wireless communication unit configured to perform a wireless communication with at least one or more external terminals including a $1^{st}$ external terminal, and a controller controlling a $1^{st}$ image message including an image received from the $1^{st}$ external terminal to be displayed on the touchscreen together with at least one of a previously saved transmitted message and a previously saved received message, the controller, if a $1^{st}$ user command is inputted in the course of displaying the $1^{st}$ image message, controlling a $1^{st}$ memo to be written on the image of the received $1^{st}$ image message.

16 Claims, 31 Drawing Sheets

MOBILE TERMINAL AND CORRESPONDING METHOD FOR TRANSMITTING MESSAGES WITH MEMOS WRITTEN THEREON

Pursuant to 35 U.S.C. §119(a), this application claims the benefit of earlier filing date and right of priority to Korean Application No. 10-2012-0041741, filed on Apr. 20, 2012, the contents of which are hereby incorporated by reference herein in their entirety.

BACKGROUND OF THE INVENTION

1. Field of the Invention

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal.

Recently, a user further tends to use messages (e.g., short text message, instant message, email message, multimedia message etc.) rather than a voice call in communicating with a counterpart through a mobile terminal. And, it is necessary to research and develop methods for a user to utilize messages in a mobile terminal.

Conventionally, a message is generally constructed with texts or characters inputted by a user via hardware and/or software key buttons of a terminal. Eventually, if a user (especially, an elder person) is not used to key buttons, it may be inconvenient for the user to communicate with a counterpart using messages.

Moreover, when a user performs a message communication with a counterpart, it may be inconvenient for the user to write and send a memo on a prescribed image to the counterpart. In particular, if the image having the memo written thereon is the image received from the counterpart in the course of the ongoing message communication, it may be inconvenient for the user to write the memo on the received image and to send the complete memo to the counterpart again.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a user not used to key buttons is facilitated to perform a communication with a counterpart via messages.

Another object of the present invention is to provide a mobile terminal and controlling method thereof, by which a memo can be conveniently sent to a counterpart in the course of an ongoing message communication in a manner of being written on an image.

A further object of the present invention is to provide a mobile terminal and controlling method thereof, by which a user is facilitated to view a memo written to a counterpart.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen, a wireless communication unit configured to perform a wireless communication with at least one or more external terminals including a $1^{st}$ external terminal, and a controller configured to display a $1^{st}$ image message including an image received from the $1^{st}$ external terminal on the touchscreen together with at least one of a previously saved transmitted message and a previously saved received message, and in response to a $1^{st}$ user command inputted in the course of displaying the $1^{st}$ image message, control a $1^{st}$ memo to be written on the image of the received $1^{st}$ image message.

In another aspect of the present invention, a method of controlling a mobile terminal according to the present invention may include performing a wireless communication with at least one or more external terminals including a $1^{st}$ external terminal, displaying a $1^{st}$ image message including an image received from the $1^{st}$ external terminal on a touchscreen together with at least one of a previously saved transmitted message and a previously saved received message, and in response to a $1^{st}$ user command inputted in the course of displaying the $1^{st}$ image message, controlling a $1^{st}$ memo to be written on the image of the received $1^{st}$ image message.

In a further aspect of the present invention, an electronic recording medium according to the present invention may include $1^{st}$ to $3^{rd}$ commands encoded therein to be executed in a mobile terminal, wherein the $1^{st}$ command is encoded to perform a wireless communication with at least one or more external terminals including a $1^{st}$ external terminal, wherein the $2^{nd}$ command is encoded to display a $1^{st}$ image message including an image received from the $1^{st}$ external terminal on a touchscreen together with at least one of a previously saved transmitted message and a previously saved received message, and wherein the $3^{rd}$ command is encoded to control a $1^{st}$ memo to be written on the image of the received $1^{st}$ image message in response to a $1^{st}$ user command inputted in the course of displaying the $1^{st}$ image message.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present inven-

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
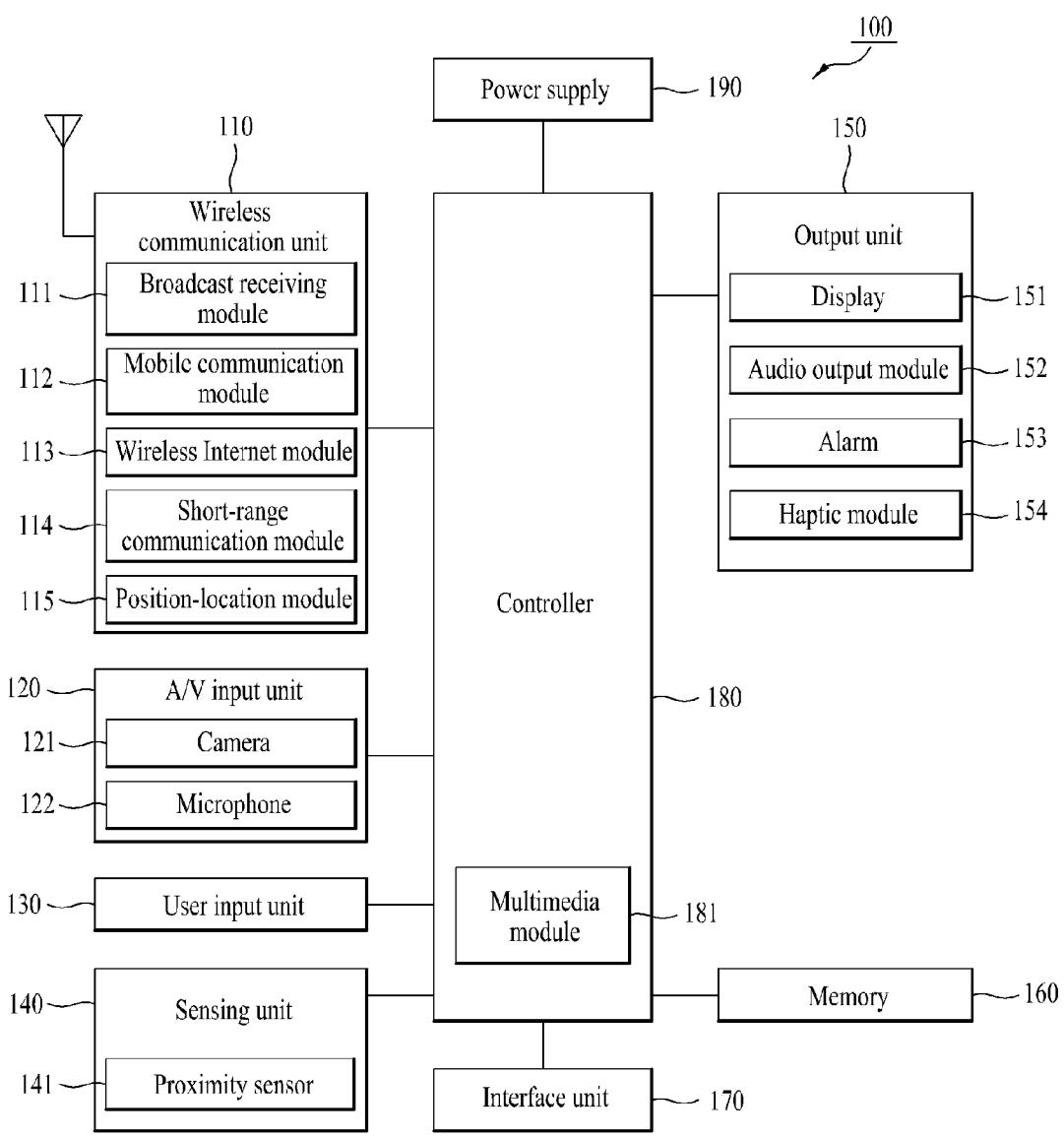
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect at least one of an ambient light around the mobile terminal 100, an open/close status of the mobile terminal 100, relative positioning of components (e.g., a display and keypad) of the mobile terminal 100, a change of position of the mobile terminal 100 or a component of the mobile terminal 100, a movement (and/or its trajectory) of the mobile terminal, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

It is not mandatory for the identity module to be detachably attached to the mobile terminal via the interface unit 170. Alternatively, the identity module may be permanently built as a sort of the memory unit 160 in the mobile terminal 100.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
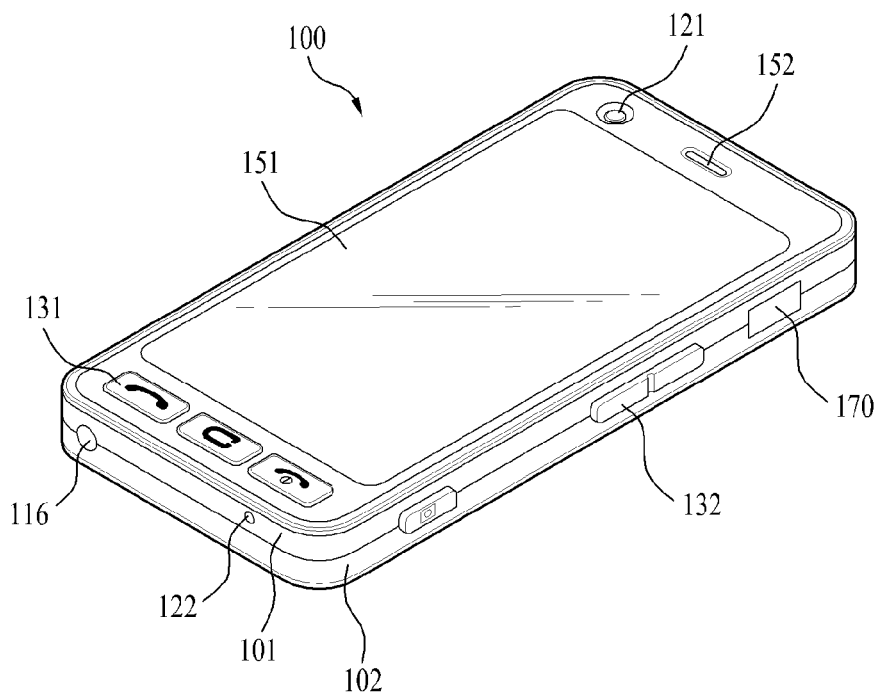
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
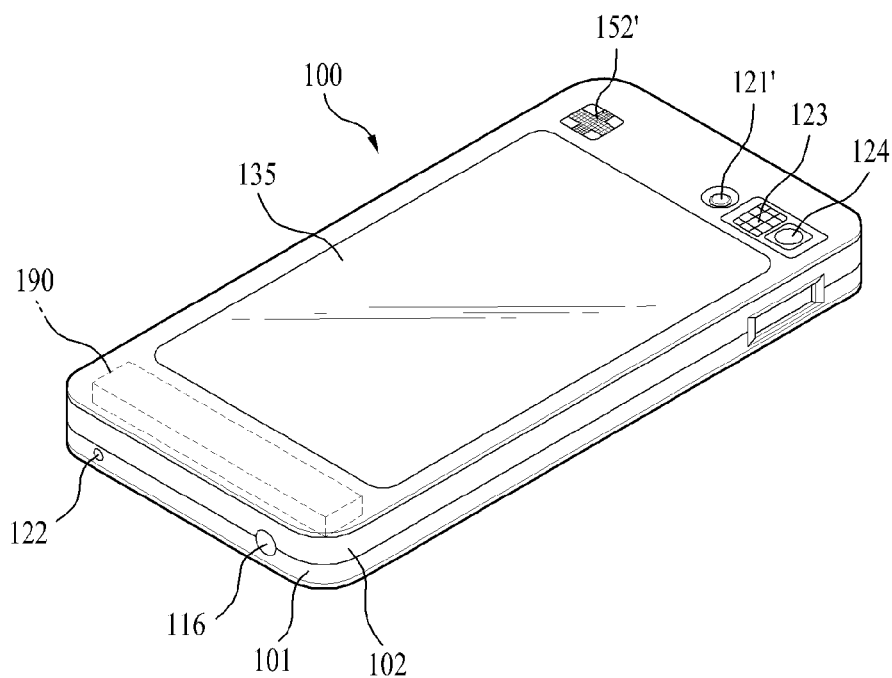
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the disclosure presented herein, embodiments related to a method, which can be implemented in the mobile terminal 100, for controlling the mobile terminal are described with reference to the accompanying drawings.

Figure 3:
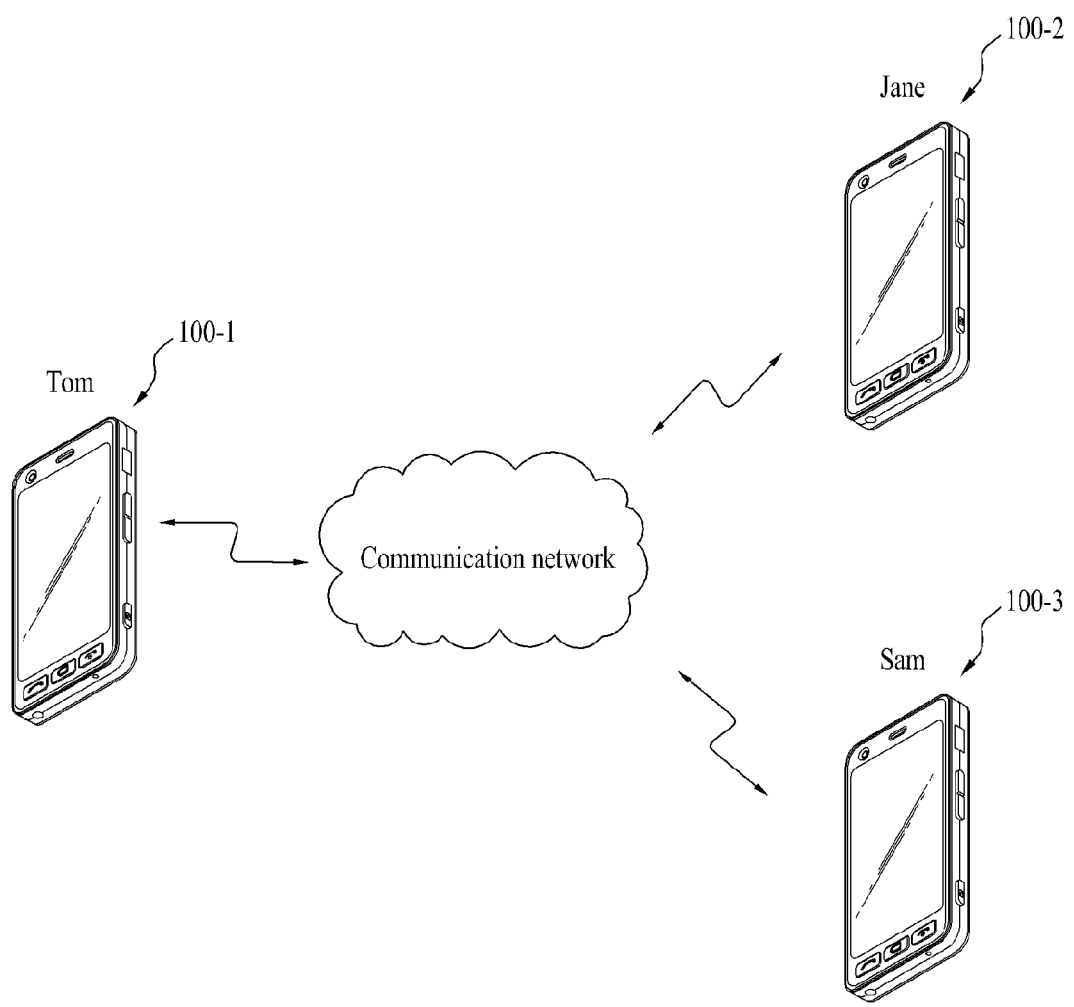
FIG. 3 is a diagram of a communication environment for implementing one embodiment of the present invention.

FIG. 3 is a diagram of a communication environment for implementing one embodiment of the present invention.

First of all, embodiments of the present invention can be implemented in the above-described mobile terminal or between at least two mobile terminals mentioned in the foregoing description.

For clarity of the following description, assume that message communications according to the embodiments of the present invention are implemented among 3 mobile terminals including a $1^{st}$ mobile terminal 100-1 (or a $1^{st}$ user 'Tom'), a $2^{nd}$ mobile terminal (or a $2^{nd}$ user 'Jane') and a $3^{rd}$ mobile terminal (or a $3^{rd}$ user 'Sam') for example. If necessary, '$1^{st}$', and '−1' shall be attached to components and reference numbers of the $1^{st}$ mobile terminal 100-1, '$2^{nd}$' and '−2' shall be attached to components and reference numbers of the $2^{nd}$ mobile terminal 100-1, and '$3^{rd}$' and '−3' shall be attached to components and reference numbers of the $1^{st}$ mobile terminal 100-1, respectively. For instance, a controller of the $1^{st}$ mobile terminal 100-1 shall be named a $1^{st}$ controller with a reference number 180-1, a controller of the $2^{nd}$ mobile terminal 100-2 shall be named a $2^{nd}$ controller with a reference number 180-2, and a controller of the $3^{rd}$ mobile terminal 100-3 shall be named a $3^{rd}$ controller with a reference number 180-3.

Moreover, if the display module 151 includes a touchscreen, implementation of the following embodiments may be further facilitated. Therefore, the following description is made on the assumption that the display module 151 includes a touchscreen.

In particular, a reference number 400 shall refer to a display screen of a $1^{st}$ touchscreen 151-1, a reference number 600 shall refer to a display screen of a $2^{nd}$ touchscreen 151-2, and a reference number 900 shall refer to a display screen of a $3^{rd}$ touchscreen 151-3, in the following description.

Figure 4:
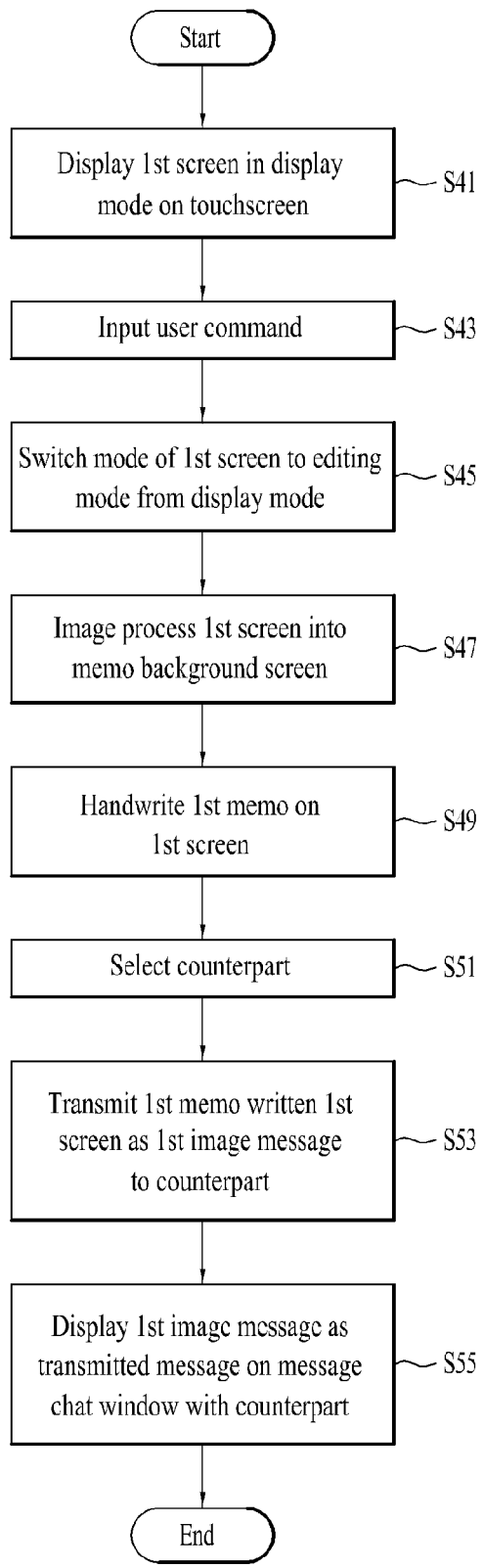
FIG. 4 is a flowchart for a method of controlling a mobile terminal according to an embodiment of the present invention.
Figure 5:
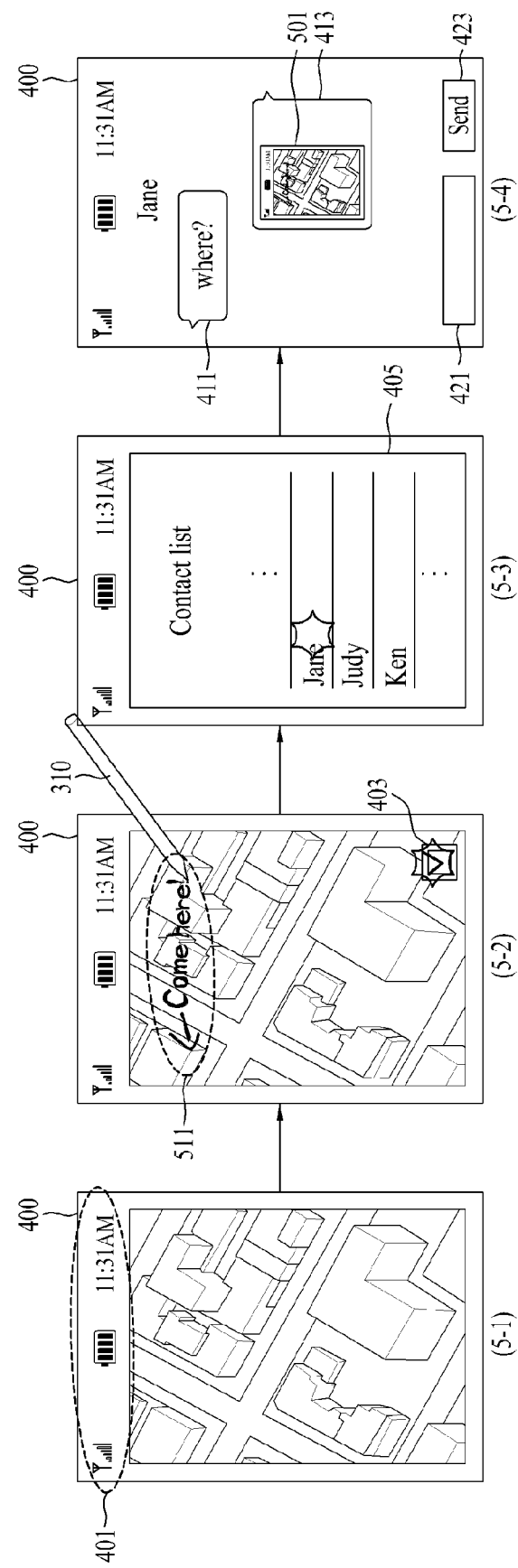
FIG. 5 is a diagram of display screen configurations of implementing a method of controlling a mobile terminal according to an embodiment of the present invention.
Figure 6:
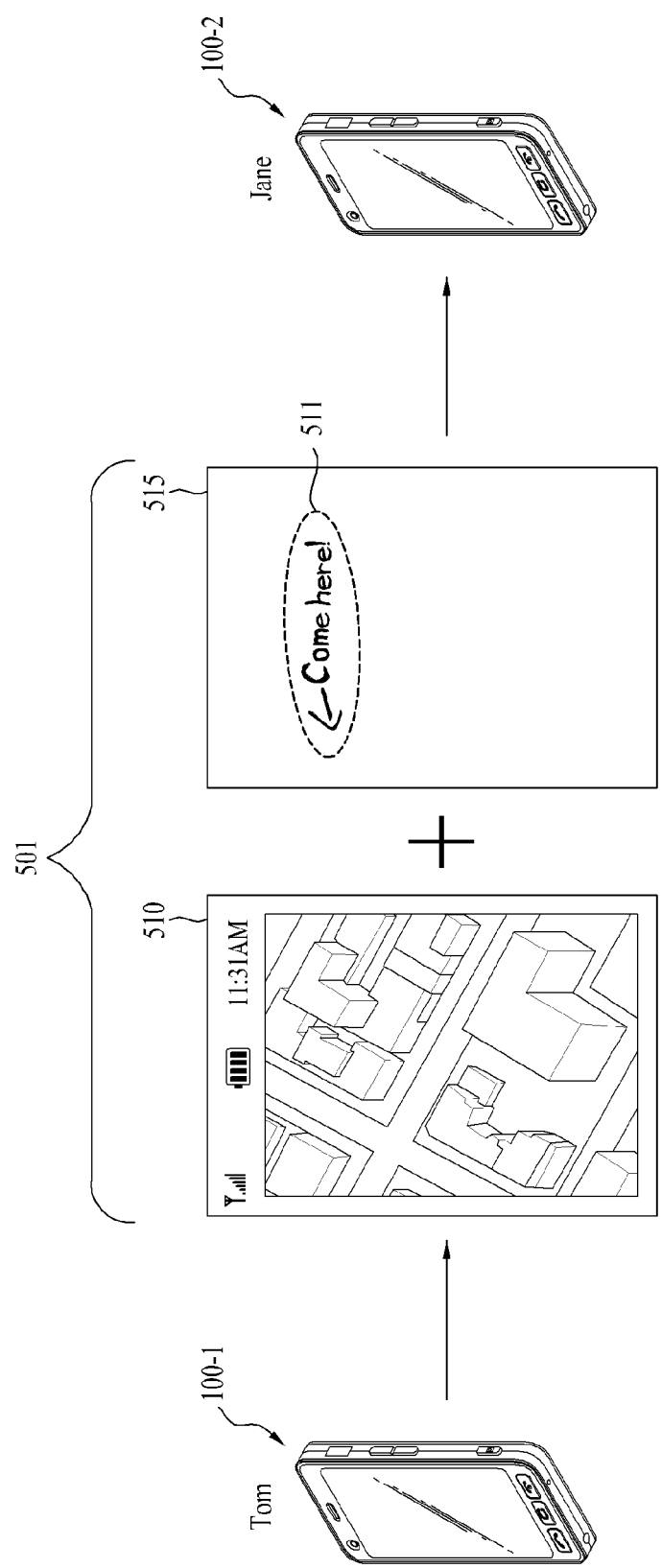
FIG. 6 is a diagram of an image message transmitted by a method of controlling a mobile terminal according to an embodiment of the present invention.

FIG. 4 is a flowchart for a method of controlling a mobile terminal according to an embodiment of the present invention. FIG. 5 is a diagram of display screen configurations of implementing a method of controlling a mobile terminal according to an embodiment of the present invention. And, FIG. 6 is a diagram of an image message transmitted by a method of controlling a mobile terminal according to an embodiment of the present invention.

Referring to FIG. 4 and FIG. 5, while a map application is active in the $1^{st}$ mobile terminal 100-1 for example, assume that a map screen is displayed on the $1^{st}$ touchscreen 400 [S41] [FIG. 5 (5-1)]. In the following description, the map screen shall be named a $1^{st}$ screen. In particular, the $1^{st}$ screen may include a full screen displayed on the $1^{st}$ touchscreen 400 or a partial screen displayed on the $1^{st}$ touchscreen 400. Moreover, the $1^{st}$ screen may include a full screen displayed on the $1^{st}$ touchscreen 400 except various indicators (e.g., reception strength indicator, power indicator, time indicator, etc.) 401 displayed thereon. For clarity of the following description, assume that the 1$^{st}$ screen includes the full screen displayed on the 1$^{st}$ touchscreen 400.

The map screen may be the 1$^{st}$ screen just for example. Any screen (e.g., an internet browser screen, a multimedia play screen for video, still image, broadcast, music or the like, a camera preview image, a document screen, a home screen, a menu screen, etc.) displayable on the 1$^{st}$ touchscreen 400 in the course of using the 1$^{st}$ mobile terminal 100-1 can become the 1$^{st}$ screen.

For clarity, assume that the 1$^{st}$ screen is currently in display mode. Besides, the display mode shall be described later.

Subsequently, a 1$^{st}$ user command may be inputted to the 1$^{st}$ mobile terminal 100-1 [S43]. In this case, the 1$^{st}$ user command is provided to switch a mode of the 1$^{st}$ screen from the display mode to an editing mode. The editing mode shall be described later.

In particular, if a software key button (not shown in the drawing) prepared on the touchscreen 400 is pressed or a specific touch gesture (e.g., a simple touch, a double touch, a touch drag along a specific trace, etc.) is performed on the touchscreen 400, the 1$^{st}$ user command may be inputted. Alternatively, if a specific hardware key button provided to the 1$^{st}$ mobile terminal 100-1 is pressed, the 1$^{st}$ user command may be inputted. Moreover, no limitation may be put on a method of inputting the 1$^{st}$ user command.

As the 1$^{st}$ screen enters the editing mode from the display mode, the 1$^{st}$ controller 180-1 may control the 1$^{st}$ screen to become a single image [S45, S47]. In this case, 'the 1$^{st}$ screen becomes the single image' may mean that the 1$^{st}$ screen becomes a memo background image or screen on which a memo can be written by a user with handwriting irrespective of graphic element type(s) (e.g., at least one of at least one text object, at least one image object, at least one link object and the like) configuring the 1$^{st}$ screen. And, if the 1$^{st}$ screen enters the editing mode, it may be understood that the 1$^{st}$ screen is captured to be used as the memo background image.

Subsequently, referring to FIG. 5 (5-2), a 1$^{st}$ user may be able to handwrite a 1$^{st}$ memo 511 on the 1$^{st}$ screen displayed on the 1$^{st}$ touchscreen 400 using such a pointer as a stylus pen 310, a finger and the like [S49].

In response to the 1$^{st}$ memo 511 inputted onto the 1$^{st}$ screen, the 1$^{st}$ controller 180-1 may control a line to be drawn on the 1$^{st}$ touchscreen 400 along a trace of the 1$^{st}$ memo 511. Hence, the 1$^{st}$ user may be able to check the 1$^{st}$ memo 511 by viewing the line drawn along the trace on the 1$^{st}$ touchscreen 400.

Thereafter, a 2$^{nd}$ user command may be inputted to the 1$^{st}$ mobile terminal 100-1. In particular, if a software key button 403, which is generated from the touchscreen 400 when the 1$^{st}$ screen enters the editing mode, is pressed or a specific touch gesture (e.g., a simple touch, a double touch, a touch drag along a specific trace, etc.) is performed on the touchscreen 400, the 2$^{nd}$ user command may be inputted. Alternatively, if a specific hardware key button provided to the 1$^{st}$ mobile terminal 100-1 is pressed, the 1$^{st}$ user command may be inputted. Moreover, no limitation may be put on a method of inputting the 2$^{nd}$ user command.

If so, the 1$^{st}$ controller 180-1 may control a contact list 405 to be displayed on the 1$^{st}$ touchscreen 400 [FIG. 5 (5-3)].

If a 2$^{nd}$ user (e.g., Jane) is touched and selected from the displayed contact list 405, the 1$^{st}$ controller 180-1 may be able to control the 1$^{st}$ memo written 1$^{st}$ screen (hereinafter named a 1$^{st}$ image message) to be transmitted to the 2$^{nd}$ mobile terminal 100-2 from the 1$^{st}$ mobile terminal 100-1 [S51, S53].

After the 1$^{st}$ image message has been transmitted, referring to FIG. 5 (5-4), the 1$^{st}$ controller 180-1 controls a message chat window, which is provided for a message chat with the 2$^{nd}$ user, to be displayed and may control the 1$^{st}$ image message to be displayed as a 1$^{st}$ transmitted message 413 on the message chat window [S55]. In doing so, the 1$^{st}$ transmitted message 413 may be displayed in a manner of being sorted or arranged in the message chat window in accordance with a corresponding transmission time.

As mentioned in the foregoing description, if the 1$^{st}$ screen is in the display mode, it may mean that it is impossible to handwrite a memo on the 1$^{st}$ screen. On the contrary, if the 1$^{st}$ screen is in the editing mode, it may mean that it is possible to handwrite a memo on the 1$^{st}$ screen.

In the following description, the 1$^{st}$ image message 501 transmitted from the 1$^{st}$ mobile terminal 100-1 to the 2$^{nd}$ mobile terminal 100-2 is explained in detail with reference to FIG. 6.

Referring to FIG. 6, the 1$^{st}$ image message 501 may include a 1$^{st}$ screen layer 510 containing a 1$^{st}$ screen (i.e., the memo background screen) and a 1$^{st}$ memo layer 515 containing a 1$^{st}$ memo 511. And, at least one of a time of transmitting the 1$^{st}$ memo layer 515 and a 1$^{st}$ mobile terminal identifier information (or a 1$^{st}$ user identifier information) of the 1$^{st}$ mobile terminal 100-1, by which the 1$^{st}$ memo 511 is written, may be included in the 1$^{st}$ image message 501 (or the 1$^{st}$ memo layer 515). How to utilize the transmission time and the identifier information shall be described later.

The 2$^{nd}$ mobile terminal 100-2 receives the 1$^{st}$ image message 501 (i.e., the 1$^{st}$ screen layer 510 and the 1$^{st}$ memo layer 515) and may be then able to display the received 1$^{st}$ image message 501 as a 1$^{st}$ received message 413 in a manner of superposing the 1$^{st}$ memo layer 515 on the 1$^{st}$ screen layer 510. Subsequently, the 2$^{nd}$ mobile terminal 100-2 writes a reply message using the received 1$^{st}$ image message 501 and may be then able to transmit the reply message to the 1$^{st}$ mobile terminal 100-1. This shall be described in detail with reference to FIGS. 7 to 11 as follows.

Figure 7:
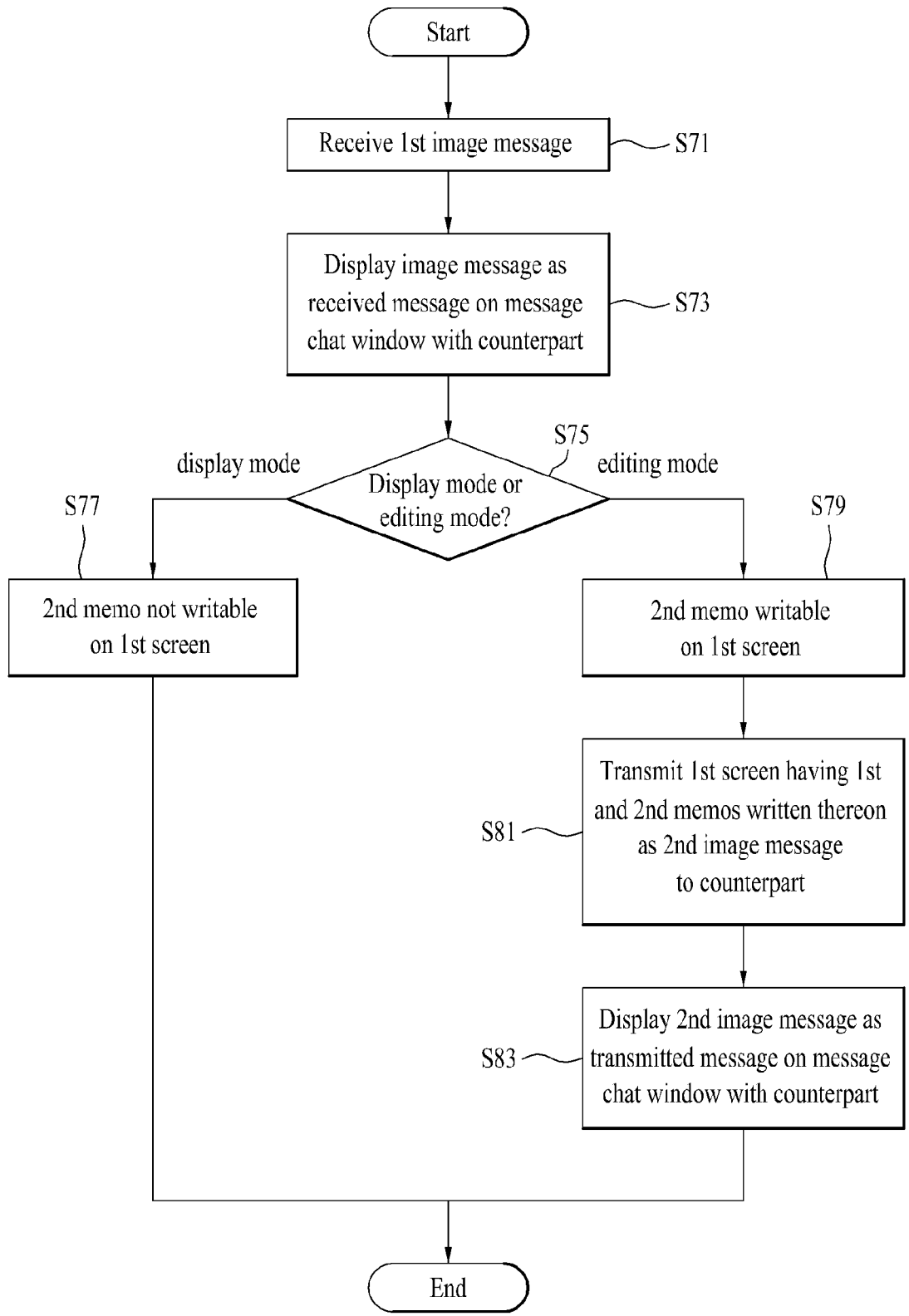
FIG. 7 is a flowchart for a method of controlling a mobile terminal according to an embodiment of the present invention.
Figure 8:
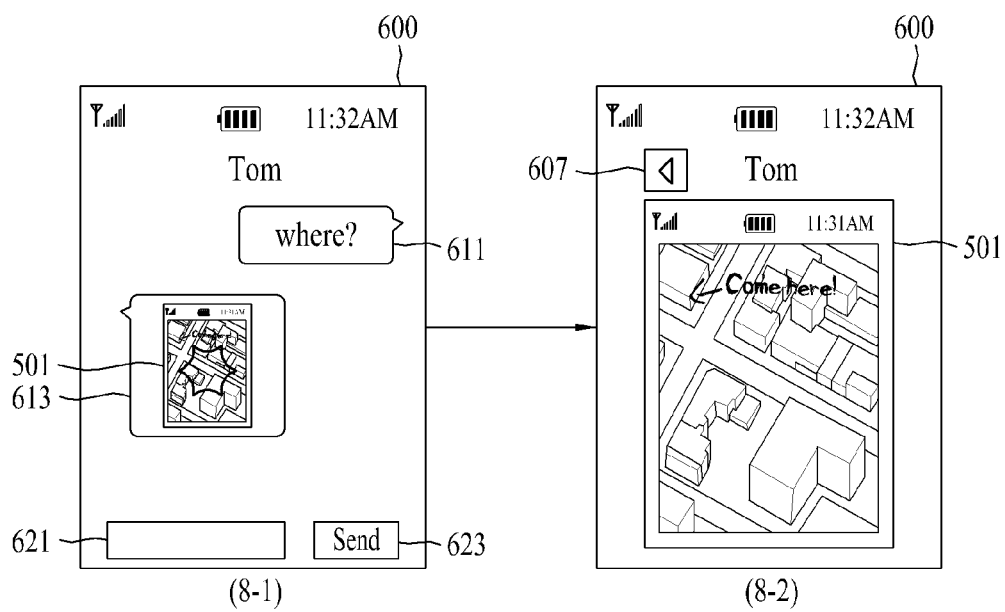
FIGS. 8 to 10 are diagrams of display screen configurations of implementing a method of controlling a mobile terminal according to an embodiment of the present invention.
Figure 9:
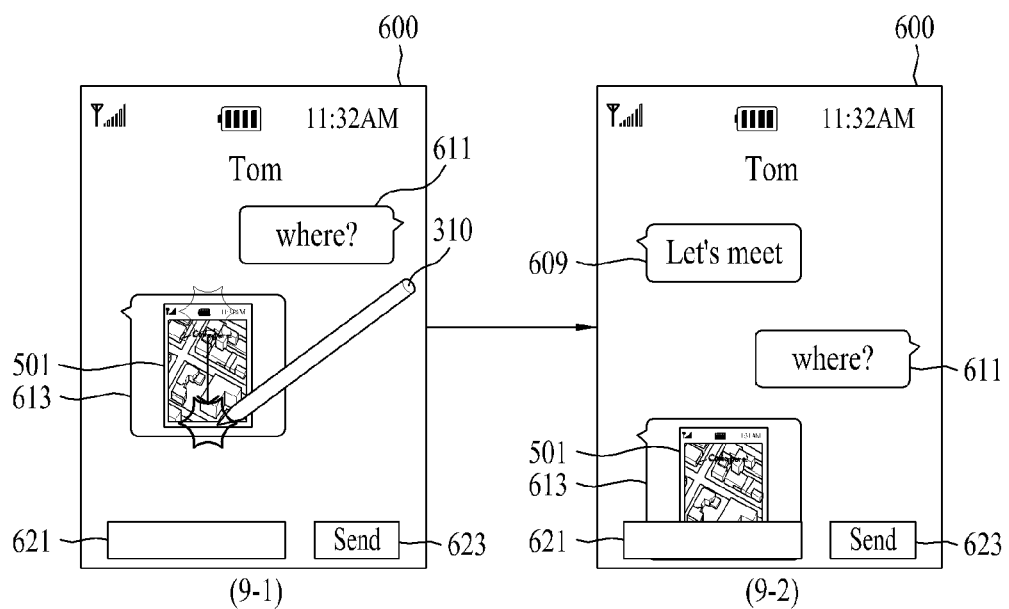
Figure 10:
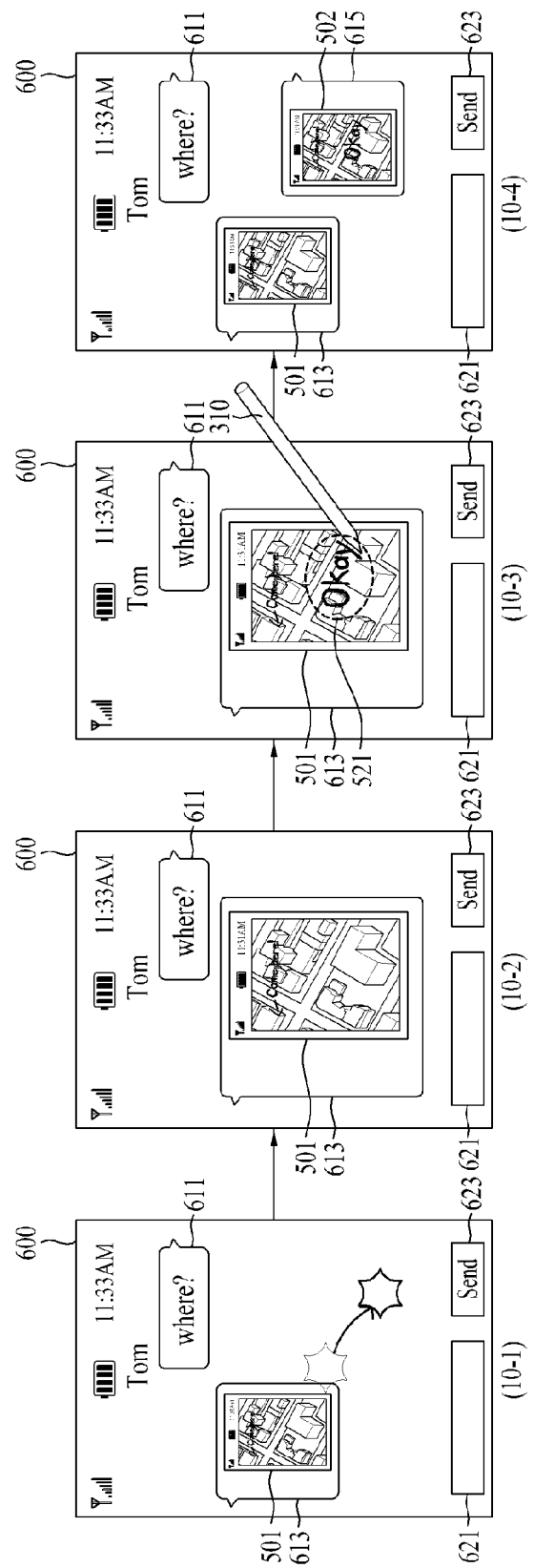
Figure 11:
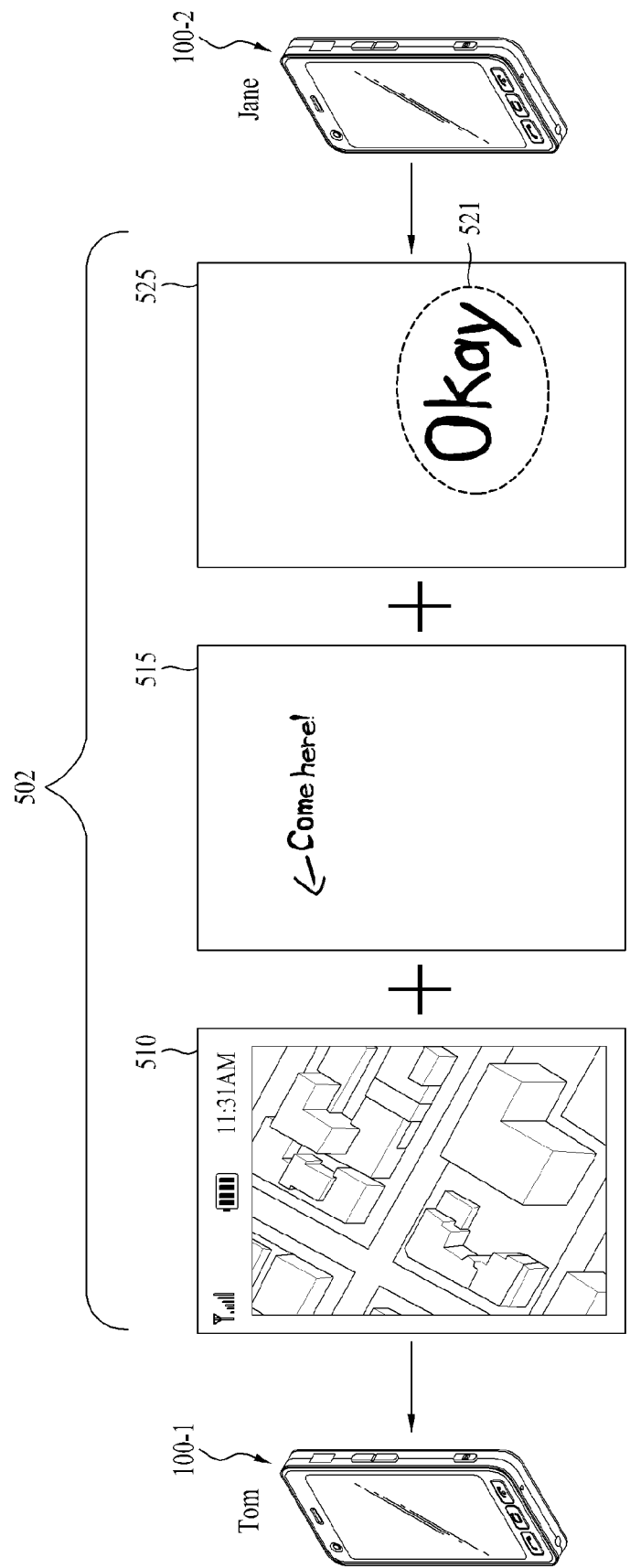
FIG. 11 is a diagram of an image message transmitted by a method of controlling a mobile terminal according to an embodiment of the present invention.

FIG. 7 is a flowchart for a method of controlling a mobile terminal according to an embodiment of the present invention. FIGS. 8 to 10 are diagrams of display screen configurations of implementing a method of controlling a mobile terminal according to an embodiment of the present invention. And, FIG. 11 is a diagram of an image message transmitted by a method of controlling a mobile terminal according to an embodiment of the present invention.

Referring to FIG. 8 (8-1), the 2$^{nd}$ mobile terminal 100-2 receives the 1$^{st}$ image message transmitted by the 1$^{st}$ mobile terminal 100-1. And, a 2$^{nd}$ controller 180-2 may control the 1$^{st}$ image message to be displayed as a 1$^{st}$ received message 613 on a message chat window, which is provided for a message chat with a 1$^{st}$ user, displayed on a 2$^{nd}$ touchscreen 600 [S71, S73]. In doing so, the 1$^{st}$ received message 613 may be displayed on the message chat window in a manner of being sorted or arranged in order of transmitted/received time together with at least one of at least one transmitted message, which is previously transmitted to a 1$^{st}$ user and saved in the memory unit 160, and at least one received message, which is previously received from the 1$^{st}$ user and saved in the memory unit 160.

In this case, the 1$^{st}$ image message (or a 1$^{st}$ screen) is displayed in display mode on the message chat window.

Hence, the $2^{nd}$ controller 180-2 may control a memo not to be handwritten on the $1^{st}$ image message by a $2^{nd}$ user [S75, S77].

A $3^{rd}$ user command for the $1^{st}$ received message 613 may be inputted. In this case, the $3^{rd}$ user command may include a user command for enlarging and displaying the $1^{st}$ received message 613. In particular, if a specific touch gesture (e.g., a simple touch, a double touch, a touch drag along a specific trace, etc.) is performed for the $1^{st}$ received message 613, the $3^{rd}$ user command may be inputted. Alternatively, if a specific hardware key button provided to the $2^{nd}$ mobile terminal 100-2 is pressed, the $3^{rd}$ user command may be inputted. No limitation may be put on a method of inputting the $3^{rd}$ user command.

If so, in response to the $3^{rd}$ user command, referring to FIG. 8 (8-2), the $1^{st}$ image 501 may be displayed in an increased size to enable the $2^{nd}$ user to view the $1^{st}$ image message 501 in further detail. In the example shown in FIG. 8 (8-2), since the $1^{st}$ image message 501 is enlarged, other received or transmitted messages previously saved are not viewable, by which the present embodiment may be non-limited. And, it is a matter of course that the $1^{st}$ image message 501 can be enlarged to be viewable together with other previously saved received or transmitted messages.

The enlarged $1^{st}$ image message is still in the display mode. Hence, the $2^{nd}$ controller 180-2 may control a memo not to be handwritten on the enlarged image message by the $2^{nd}$ user as well.

When the $1^{st}$ image message 501 is enlarged and displayed, the $2^{nd}$ controller 180-2 may control a chat window return icon 607 to be displayed on the touchscreen 600. Hence, if the $2^{nd}$ user touches and selects the chat window return icon 607, referring now to FIG. 8 (8-1), the $2^{nd}$ controller 180-2 may control the chat window, on which the $1^{st}$ image message 501 is displayed as the $1^{st}$ received message 613, to be displayed again.

In the following description, the $1^{st}$ image message in the display mode is explained in detail with reference to FIG. 9.

Referring to FIG. 9 (9-1), while the $1^{st}$ image message 501 is displayed as the $1^{st}$ received message 613 on the $2^{nd}$ touchscreen 600, a touch drag in top-to-bottom direction with a pointer may be inputted onto the $1^{st}$ message image 501.

Since the $1^{st}$ image message 613 is in the display mode, the $2^{nd}$ controller 180-2 may control any memo or handwriting not to be performed on the $1^{st}$ image message 501 in response to the touch drag.

Instead, referring to FIG. 9 (9-2), in response to the top-to-bottom touch drag, the $2^{nd}$ controller 180-2 may control a chat window, which is displayed on the touchscreen 600, to be scrolled in the top-to-bottom direction.

In the following description, a process for changing or switching the mode of the $1^{st}$ image message to an editing mode from the display mode is explained with reference to FIG. 10.

Referring to FIG. 10 (10-1), while the $1^{st}$ image message 501 is displayed as the $1^{st}$ received message 613 on the $2^{nd}$ touchscreen 600, a $4^{th}$ user command may be inputted for the $1^{st}$ image message 501 (or the $1^{st}$ received message 613). In this case, the $4^{th}$ user command may include a user command for switching a mode of the $1^{st}$ image message 501 from the display mode to the editing mode [S75]. In particular, if a specific touch gesture (e.g., a simple touch, a double touch, a touch drag along a specific trace, etc.) is performed on the $1^{st}$ image message 501 (or the $1^{st}$ received message 613), the $4^{th}$ user command may be inputted. Alternatively, if a specific hardware key button provided to the $2^{nd}$ mobile terminal 100-2 is pressed, the $4^{th}$ user command may be inputted. Moreover, no limitation may be put on a method of inputting the $4^{th}$ user command.

FIG. 10 (10-1) shows one example that the $4^{th}$ user command includes a touch & drag performed on one corner of the $1^{st}$ image message 501 (or the $1^{st}$ received message 613) in outer direction thereof.

Referring to FIG. 10 (10-2), in response to the touch drag of the $2^{nd}$ user command, the $2^{nd}$ controller 180-2 controls the $1^{st}$ image message 501 to be enlarged in proportion to a length of the touch drag and may be also able to control the enlarged $1^{st}$ image message 501 to enter an editing mode from a display mode. Besides, when a touch drag is performed in a manner of touching the corner of the enlarged $1^{st}$ image message 501 and then performing a drag in inner direction thereof, the $2^{nd}$ controller 180-2 controls the enlarged $1^{st}$ image message 501 to return to its original size and may be also able to control the $1^{st}$ image message 501 to return to the display mode from the editing mode [not shown in the drawing].

When the mode of the $1^{st}$ image message 501 is switched to the editing mode, referring to FIG. 10 (10-3), the $2^{nd}$ user may be able to handwrite a $2^{nd}$ memo 521 on the enlarged $1^{st}$ image message 501 displayed on the $2^{nd}$ touchscreen 600 using a pointer 310 [S79].

In response to the $2^{nd}$ memo 521 inputted onto the $1^{st}$ image message 501, the $2^{nd}$ controller 180-2 may control a line to be drawn on the $2^{nd}$ touchscreen 600 along a trace of the $2^{nd}$ memo 521. Therefore, a terminal user is able to check the $2^{nd}$ memo 521 by viewing the line drawn along the trace on the $2^{nd}$ touchscreen 600.

If an icon 'Send' 623 provided to the chat window on the $2^{nd}$ touchscreen 600 is touched by the $2^{nd}$ user, the $2^{nd}$ controller 180-2 may be able to control the $1^{st}$ image message 501 (hereinafter named a $2^{nd}$ image message 502) having the $2^{nd}$ memo 521 written thereon to be sent to the $1^{st}$ mobile terminal 100-1 from the $2^{nd}$ mobile terminal 100-2 [S81].

After the $2^{nd}$ image message 502 has been sent, referring to FIG. 10 (10-4), the $2^{nd}$ controller 180-2 may control the $2^{nd}$ image message 502 to be instantly displayed as a $2^{nd}$ transmitted message 615 on the message chat window for the message chat with the user [S83].

In the following description, the $2^{nd}$ image message 502 sent to the $1^{st}$ mobile terminal 100-1 from the $2^{nd}$ mobile terminal 100-2 is explained in detail with reference to FIG. 11.

First of all, the $2^{nd}$ image message 502 may include a $1^{st}$ screen layer 510 containing a $1^{st}$ screen (i.e., the memo background screen), a $1^{st}$ memo layer containing a $1^{st}$ memo 511, and a $2^{nd}$ memo layer 525 containing a $2^{nd}$ memo 521. In the $2^{nd}$ memo layer 525, at least one of a time of transmitting the $2^{nd}$ memo layer 525 and a $2^{nd}$ mobile terminal identifier information (or a $2^{nd}$ user identifier information) of the $2^{nd}$ mobile terminal having the $2^{nd}$ memo 521 written therein may be included. Utilization of the transmission time and the identifier information shall be described later.

The $1^{st}$ mobile terminal 100-1 receives the $2^{nd}$ image message 502 and may be then able to display the received $2^{nd}$ image message 502 as a $2^{nd}$ received message 415 in a manner of superposing the $1^{st}$ memo layer 515 and the $2^{nd}$ memo layer 525 over the $1^{st}$ screen layer 510. Subsequently, the $1^{st}$ mobile terminal 100-1 writes a reply message using the received $2^{nd}$ image message 502 and may be then able to transmit the reply message to the $2^{nd}$ mobile terminal 100-2. This shall be described in detail with reference to FIG. 12 and FIG. 13 as follows.

Figure 12:
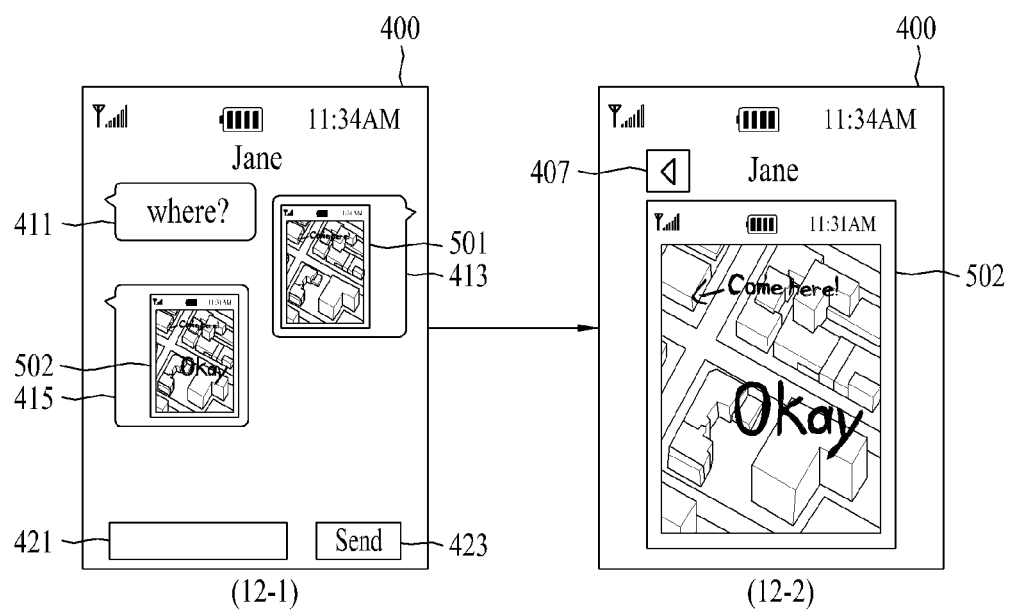
FIG. 12 and FIG. 13 are diagrams of display screen configurations of implementing a method of controlling a mobile terminal according to an embodiment of the present invention.
Figure 13:
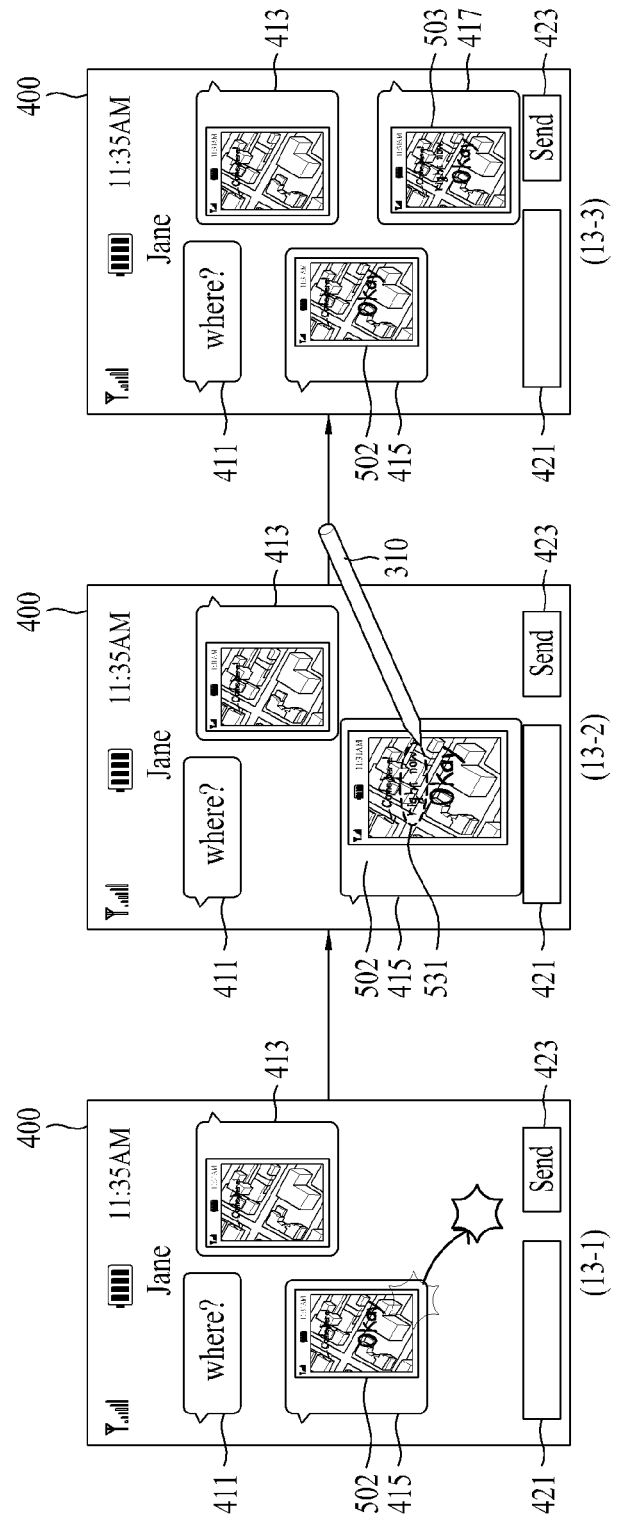

FIG. 12 and FIG. 13 are diagrams of display screen configurations of implementing a method of controlling a mobile terminal according to an embodiment of the present invention.

Referring to FIG. 12 (12-1), the $1^{st}$ mobile terminal 100-1 receives the $2^{nd}$ image message 502 transmitted by the $2^{nd}$ mobile terminal 100-2. And, the $1^{st}$ controller 180-1 may control the $2^{nd}$ image message 502 to be displayed as a $2^{nd}$ received message 415 on the message chat window displayed on the $1^{st}$ touchscreen 400, which is provided for a message chat with a $2^{nd}$ mobile terminal 100-2.

In this case, the $2^{nd}$ image message is displayed in display mode on the message chat window. Hence, the $1^{st}$ controller 180-1 may control a memo not to be handwritten on the $1^{st}$ image message by the $1^{st}$ user.

A $3^{rd}$ user command for enlarging and displaying the $2^{nd}$ received message 415 may be inputted. For clarity, since the $3^{rd}$ user command is mentioned in the foregoing description, it details shall be omitted from the following description.

If so, as mentioned in the foregoing description, in response to the $3^{rd}$ user command, referring to FIG. 12 (12-2), the $2^{nd}$ image 502 may be displayed in an increased size.

The enlarged $2^{nd}$ image message 502 is still in the display mode. Hence, the $1^{st}$ controller 180-1 may control a memo not to be handwritten on the enlarged $2^{nd}$ image message 502 by the $1^{st}$ user as well.

While the $2^{nd}$ image message 502 is enlarged and displayed, if a chat window return icon 407 displayed on the touchscreen 400 is touched, referring now to FIG. 12 (12-1), the $1^{st}$ controller 180-1 may control a chat window, on which the $2^{nd}$ image message 502 is displayed as the $2^{nd}$ received message 415, to be displayed.

In the following description, a process for changing or switching the mode of the $2^{nd}$ image message from the display mode to the editing mode is explained with reference to FIG. 13.

Referring to FIG. 13 (13-1), while the $2^{nd}$ image message 502 is displayed as the $2^{nd}$ received message 415 on the $1^{st}$ touchscreen 400, a $4^{th}$ user command may be inputted to switch mode of the $2^{nd}$ image message to the editing mode from the display mode. Since the $4^{th}$ user command is mentioned in the foregoing description, its details shall be omitted from the following description.

FIG. 13 (13-1) shows one example that the $4^{th}$ user command includes a touch & drag performed on one corner of the $2^{nd}$ image message 502 (or the $2^{nd}$ received message 415) in outer direction thereof.

Referring to FIG. 13 (13-2), in response to the touch drag of the $4^{th}$ user command, the $1^{st}$ controller 180-1 controls the $2^{nd}$ image message 502 to be enlarged in proportion to a length of the touch drag and may be also able to control the enlarged $2^{nd}$ image message 502 to enter the editing mode from the display mode. Besides, as mentioned in the foregoing description, when a touch drag is performed in a manner of touching the corner of the enlarged $2^{nd}$ image message 502 and then performing a drag in inner direction thereof, the $1^{st}$ controller 180-1 controls the enlarged $2^{nd}$ image message 502 to return to its original size and may be also able to control the $2^{nd}$ image message 502 to return to the display mode from the editing mode.

When the mode of the $2^{nd}$ image message 502 is switched to the editing mode, referring to FIG. 13 (13-2), the $1^{st}$ user may be able to handwrite a $3^{rd}$ memo 531 on the enlarged $2^{nd}$ image message 502 displayed on the $1^{st}$ touchscreen 400 using a pointer 310.

In response to the $3^{rd}$ memo 531 inputted onto the $2^{nd}$ image message 502, the $1^{st}$ controller 180-1 may control a line to be drawn on the $1^{st}$ touchscreen 400 along a trace of the $3^{rd}$ memo 531. Therefore, the $1^{st}$ user is able to check the $3^{rd}$ memo 531 by viewing the line drawn along the trace on the $1^{st}$ touchscreen 400.

If an icon 'Send' 423 provided to the chat window on the $1^{st}$ touchscreen 400 is touched by the $1^{st}$ user, the $1^{st}$ controller 180-1 may be able to control the $2^{nd}$ image message 502 (hereinafter named a $3^{rd}$ image message 503) having the $3^{rd}$ memo 531 written thereon to be sent from the $1^{st}$ mobile terminal 100-1 to the $2^{nd}$ mobile terminal 100-2.

After the $3^{rd}$ image message 503 has been sent, referring to FIG. 13 (13-3), the $1^{st}$ controller 180-1 may control the $3^{rd}$ image message 503 to be instantly displayed as a $3^{rd}$ transmitted message 417 on the message chat window for the message chat with the $2^{nd}$ user.

Meanwhile, when the $3^{rd}$ image message 503 is transmitted to the $2^{nd}$ mobile terminal 100-2 from the $1^{st}$ mobile terminal 100-1, the $3^{rd}$ image message 503 can be simultaneously transmitted not only to the $2^{nd}$ mobile terminal 100-2 (or the $2^{nd}$ user) but also to the $3^{rd}$ mobile terminal 100-3 (or the $3^{rd}$ user) by batch arrival. Alternatively, the $3^{rd}$ image message 503 may be delivered to the $3^{rd}$ mobile terminal 100-3 only. This may be possible if the $3^{rd}$ mobile terminal 100-3 is additionally designated as a recipient of the $3^{rd}$ image message 503 from the $1^{st}$ mobile terminal 100-1 or the $3^{rd}$ mobile terminal 100-3 is designated instead of the $2^{nd}$ mobile terminal 100-2, in response to an appropriate user command. For clarity, since how to simultaneously send a prescribed message to at least two counterparts by batch arrival or how to send a prescribed message to a $3^{rd}$ party counterpart can be easily understood by those skilled in the art, their details shall be omitted from the following description.

In the following description, how to simultaneously send the $3^{rd}$ image message 503 from the $1^{st}$ mobile terminal 100-1 to both of the $2^{nd}$ mobile terminal 100-2 and the $3^{rd}$ mobile terminal 100-3 by batch arrival is explained in detail with reference to FIG. 14.

Figure 14:
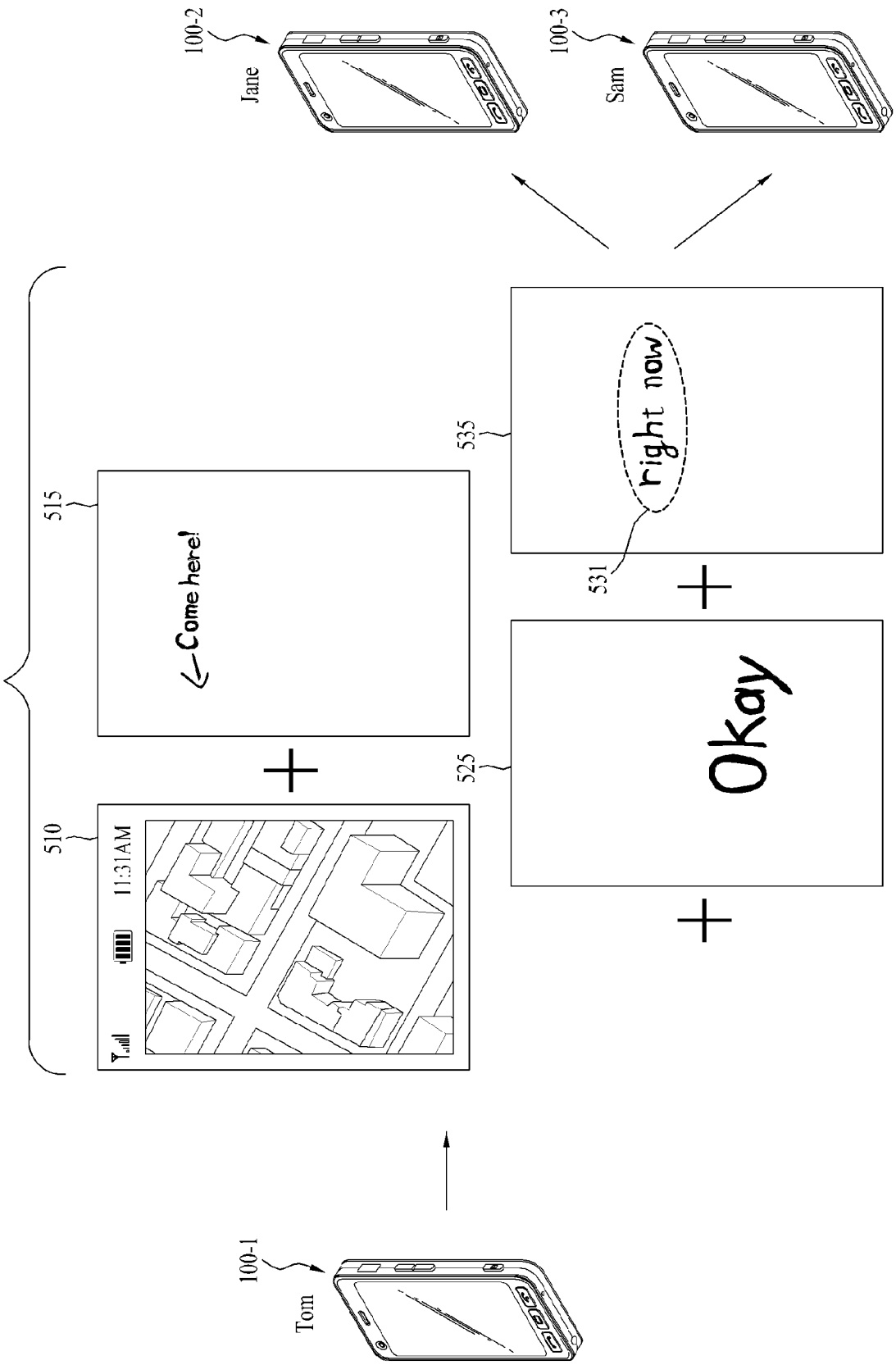
FIG. 14 is a diagram of an image message transmitted by a method of controlling a mobile terminal according to an embodiment of the present invention.

FIG. 14 is a diagram of an image message transmitted by a method of controlling a mobile terminal according to an embodiment of the present invention.

Referring to FIG. 14, the $3^{rd}$ image message 503 may include a $1^{st}$ screen layer 510 containing a $1^{st}$ screen (i.e., the memo background screen), a $1^{st}$ memo layer 515 containing a $1^{st}$ memo 511, a $2^{nd}$ memo layer 525 containing a $2^{nd}$ memo 521 and a $3^{rd}$ memo layer 535 containing a $3^{rd}$ memo 531. In the $3^{rd}$ memo layer 535, at least one of a time of transmitting the $3^{rd}$ memo layer 535 and a $1^{st}$ mobile terminal identifier information (or a $1^{st}$ user identifier information) of the $1^{st}$ mobile terminal having the $3^{rd}$ memo 531 written therein may be included.

In the following description, the $2^{nd}$ image message 502 received by the $1^{st}$ mobile terminal 100-1 in the editing mode is explained in detail with reference to FIG. 15.

Figure 15:
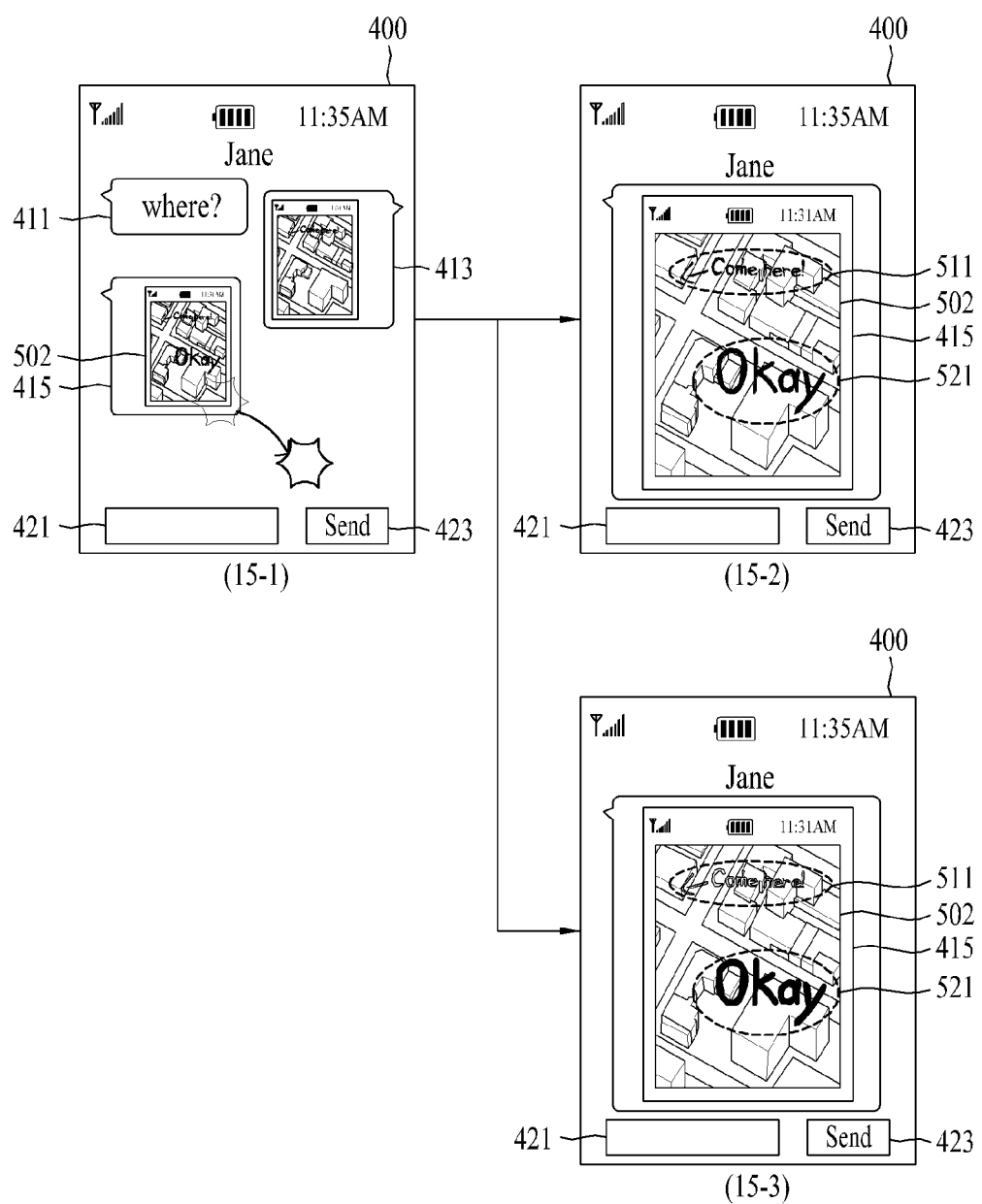
FIGS. 15 to 19 are diagrams of display screen configurations of implementing a method of controlling a mobile terminal according to an embodiment of the present invention.

FIG. 15 is a diagram of display screen configurations of implementing a method of controlling a mobile terminal according to an embodiment of the present invention.

Referring to FIG. 15 (15-1), while the $2^{nd}$ image message 502 is being displayed as the $2^{nd}$ received message 415 on the $1^{st}$ touchscreen 400, a $4^{th}$ user command may be inputted to switch the mode of the $2^{nd}$ image message 502 to the editing mode from the display mode.

If so, referring to FIG. 15 (15-2), the $1^{st}$ controller 180-1 may control the $1^{st}$ memo 511 and the $2^{nd}$ memo 521 to be simultaneously viewed as originally written forms in the $2^{nd}$ image message 502 having entered the editing mode. In this case, the $1^{st}$ user may have difficulty in recognizing which one of the $1^{st}$ memo 511 and the $2^{nd}$ memo 521 is the recent one or which one of the $1^{st}$ memo 511 and the $2^{nd}$ memo 521 is written by the $1^{st}$ user.

Hence, referring to FIG. 15 (15-3), the $1^{st}$ controller 180-1 may control the most recently written $2^{nd}$ memo 521 to be displayed on the $2^{nd}$ image message 502 having entered the editing mode in a manner of being visually discriminated from the $1^{st}$ memo 511 written ahead of the $2^{nd}$ memo 521. FIG. 15 (15-3) shows one example that the most recently written $2^{nd}$ memo 521 is displayed thicker or bolder than the $1^{st}$ memo 511 written ahead of the $2^{nd}$ memo 521.

Besides, in case that at least 3 memos exist in the editing mode entered $2^{nd}$ image message 502, they can be displayed increasingly thick in a manner that the latest memo is displayed thickest or boldest and that the earliest memo is displayed least thick.

In a certain case, on the editing mode entered $2^{nd}$ image message 502, the most recently written $2^{nd}$ memo 521 only may be displayed. Alternatively, if the $2^{nd}$ image message 502 enters the editing mode within a prescribed time from a reception time of the $2^{nd}$ image message 502, the most recently written $2^{nd}$ memo 521 is displayed only, and if the $2^{nd}$ image message 502 enters the editing mode after prescribed duration from a reception time of the $2^{nd}$ image message 502, all the memos including the $2^{nd}$ memo can be displayed.

If a prescribed duration of the $1^{st}$ memo or the $2^{nd}$ memo expires from its corresponding creation time, the $1^{st}$ controller 180-1 may be able to control the corresponding memo to disappear from the editing mode entered $2^{nd}$ image message 502 displayed on the corresponding touchscreen gradually or immediately.

Alternatively, when a prescribed number of memo layers or more are cumulated on the $1^{st}$ screen (or memo background) layer, the $1^{st}$ controller 180-1 may control the oldest memo layer to disappear from the touchscreen gradually or instantly.

The memo layer disappearing from the $2^{nd}$ image message in the editing mode may not be viewable despite that the mode of the $2^{nd}$ image message is switched to the display mode.

Alternatively, the memo layer disappearing from the $2^{nd}$ image message in the editing mode is not viewable only despite existing. Thus, if the $2^{nd}$ image message enters the display mode, the corresponding memo layer may become viewable again. Hence, after a $3^{rd}$ memo has been written on the $2^{nd}$ image message in the editing mode, even if the $2^{nd}$ image message (i.e., the $3^{rd}$ image message) having the $3^{rd}$ memo written thereon is transmitted to a counterpart, the unseen memo layer can be still transmitted to the counterpart.

Moreover, the $1^{st}$ controller 180-1 may be able to control the $2^{nd}$ memo 521, which is written by the counterpart (e.g., the $2^{nd}$ user) to be displayed on the editing mode entered $2^{nd}$ image 502 in a manner of being visually discriminated from the $1^{st}$ memo 511 written by the corresponding user (e.g., the $1^{st}$ user).

In the following description, how the $1^{st}$ image message 501 received by the $2^{nd}$ mobile terminal 100-2 enters the editing mode from the display mode is in detail explained with reference to FIG. 16.

Figure 16:
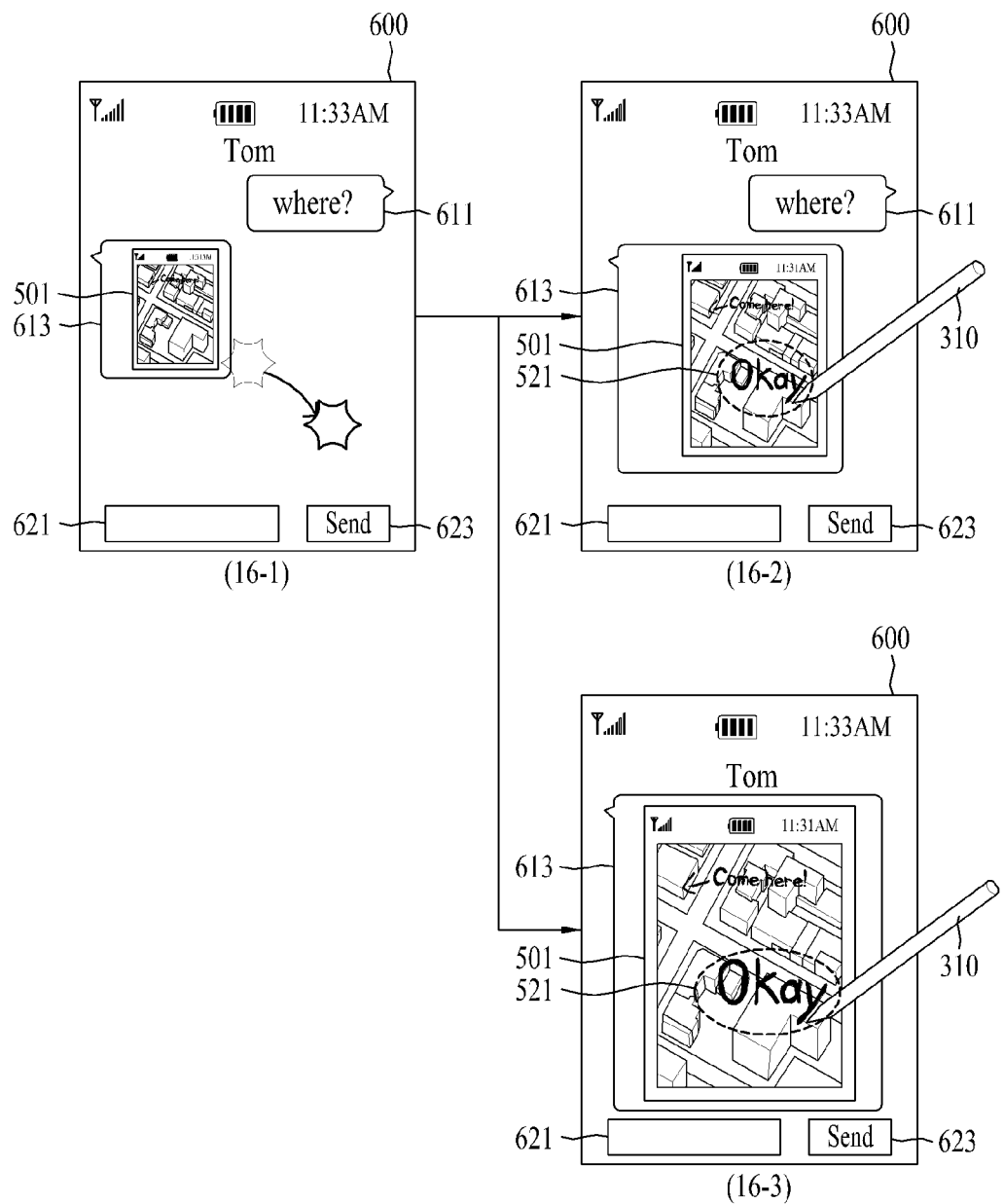

FIG. 16 is a diagram of display screen configurations of implementing a method of controlling a mobile terminal according to an embodiment of the present invention.

Referring to FIG. 16 (16-1), while the $1^{st}$ image 501 is displayed as the $1^{st}$ received message 613 on the $2^{nd}$ touchscreen 600, a $4^{th}$ user command for switching the mode of the $1^{st}$ image message 501 to the editing mode from the display mode may be inputted. In this case, assume that the $4^{th}$ user command includes a touch drag performed in a manner of touching and then dragging a prescribed corner of the $1^{st}$ image message 501 (or the $1^{st}$ received message 613) in outer direction thereof.

In response to the $4^{th}$ user command, the $2^{nd}$ controller 180-2 may be able to calculate a length of the touch drag in the outer direction.

If the calculated length of the touch drag is equal to or smaller than a prescribed length, referring to FIG. 16 (16-2), the $2^{nd}$ controller 180-2 may be able to control the editing mode entered $1^{st}$ received message 613 to be enlarged enough to be viewed together with other transmitted and/or received messages saved previously.

On the contrary, if the calculated length of the touch drag is greater than the prescribed length, referring to FIG. 16 (16-3), the $2^{nd}$ controller 180-2 may be able to control the editing mode entered $1^{st}$ received message 613 to be enlarged enough to be viewed only without other transmitted and/or received messages saved previously.

In the following description, how the $1^{st}$ image message 501 received by the $2^{nd}$ mobile terminal 100-2 enters the editing mode from the display mode is explained in detail with reference to FIG. 17 and FIG. 18.

Figure 17:
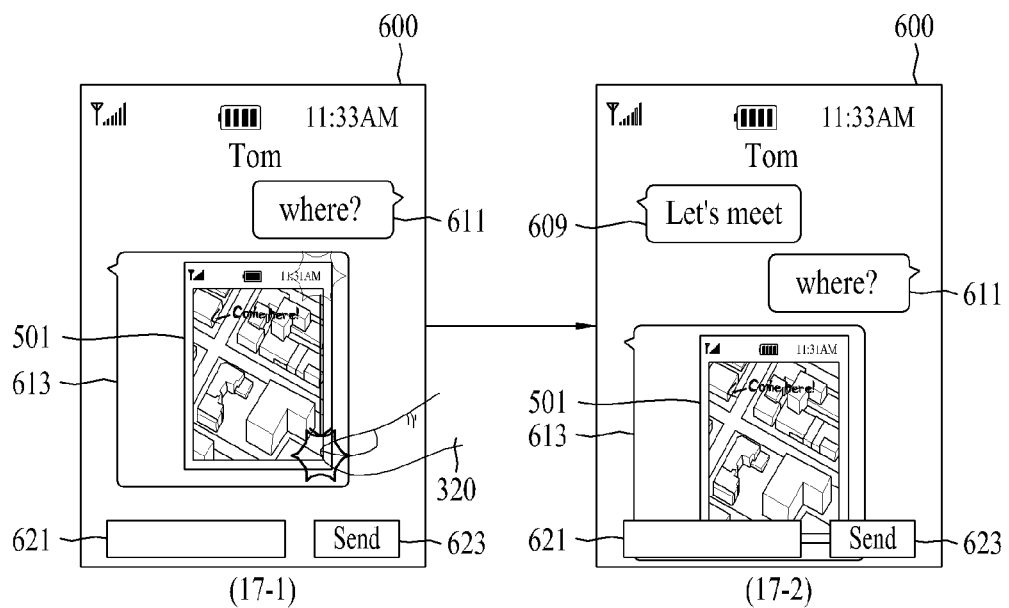
Figure 18:
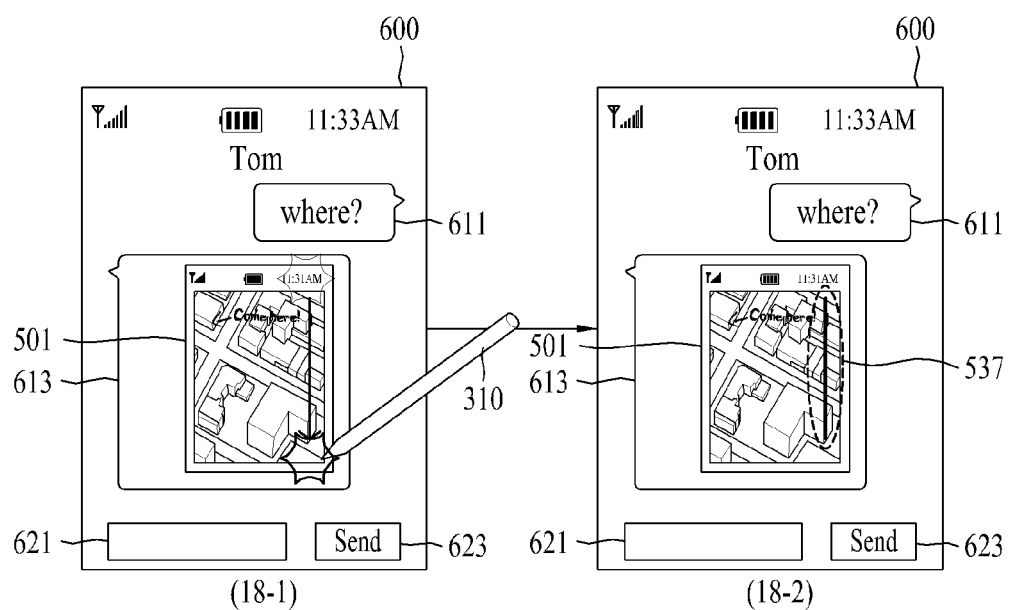

FIG. 17 and FIG. 18 are diagrams of display screen configurations of implementing a method of controlling a mobile terminal according to an embodiment of the present invention.

First of all, as mentioned in the forgoing description with reference to FIG. 16 (16-1), while the $1^{st}$ image 501 is displayed as the $1^{st}$ received message 613 on the $2^{nd}$ touchscreen 600, a prescribed corner of the $1^{st}$ image message 501 (or the $1^{st}$ received message 613) may be touched and then dragged in outer direction thereof.

In response to the touch drag in the outer direction, referring to FIG. 17 (17-1), the $2^{nd}$ controller 1802 only controls the $1^{st}$ image message 501 to be enlarged and may be also able to control the $1^{st}$ image message 501 to keep staying in the display mode. When the $1^{st}$ image message 501 is enlarged and displayed, the $2^{nd}$ user may be able to perform a top-to-bottom touch drag on the enlarged $1^{st}$ image message 501 with a finger 320.

If so, the $2^{nd}$ controller 180-2 calculates a contact area of the pointer (e.g., the finger) with which the top-to-bottom touch drag is performed.

If the calculated contact area is equal to or greater than a predetermined area, the $2^{nd}$ controller 180-2 may control the $1^{st}$ image message 501 to keep staying in the display mode. Therefore, referring to FIG. 17 (17-2), the $2^{nd}$ controller 180 may be able to control the chat window to be scrolled in response to the top-to-bottom touch drag.

Meanwhile, referring to FIG. 18 (18-1), while the $1^{st}$ image message 501 is enlarged and displayed, the $2^{nd}$ user may perform a touch drag in top-to-bottom direction on the enlarged $1^{st}$ image message 501 with a stylus pen 310 for example.

If so, the $2^{nd}$ controller 180-2 may calculate a contact area (or thickness) of the pointer (i.e., the stylus pen) with which the top-to-bottom touch drag is performed.

If the calculated contact area is equal to or smaller than a predetermined area, the $2^{nd}$ controller 180-2 may control the display mode of the $1^{st}$ image message 501 to be switched to the editing mode.

Therefore, referring to FIG. 18 (18-2), the $2^{nd}$ controller 180 may be able to control a handwriting to be inputted onto the $1^{st}$ image message 501 in response to the top-to-bottom touch drag.

According to the above description, whether to switch to the editing mode of the $1^{st}$ image message is determined depending on the contact area of the pointer applied to the touchscreen, by which the present embodiment may be non-limited. For instance, whether to switch to the editing mode of the $1^{st}$ image message can be determined depending on one of a pressure, moving speed and capacitance of the pointer applied to the touchscreen.

According to the above description, in the $2^{nd}$ mobile terminal 100-2, a memo is additionally written on the memo writing screen captured from the $1^{st}$ mobile terminal 100-2. Yet, it is not always necessary for the memo to be additionally written on the memo writing screen in the $2^{nd}$ mobile terminal 100-2, which is captured from the $1^{st}$ mobile terminal 100-1. This is described in detail with reference to FIGS. 19 to 21 as follows.

Figure 19:
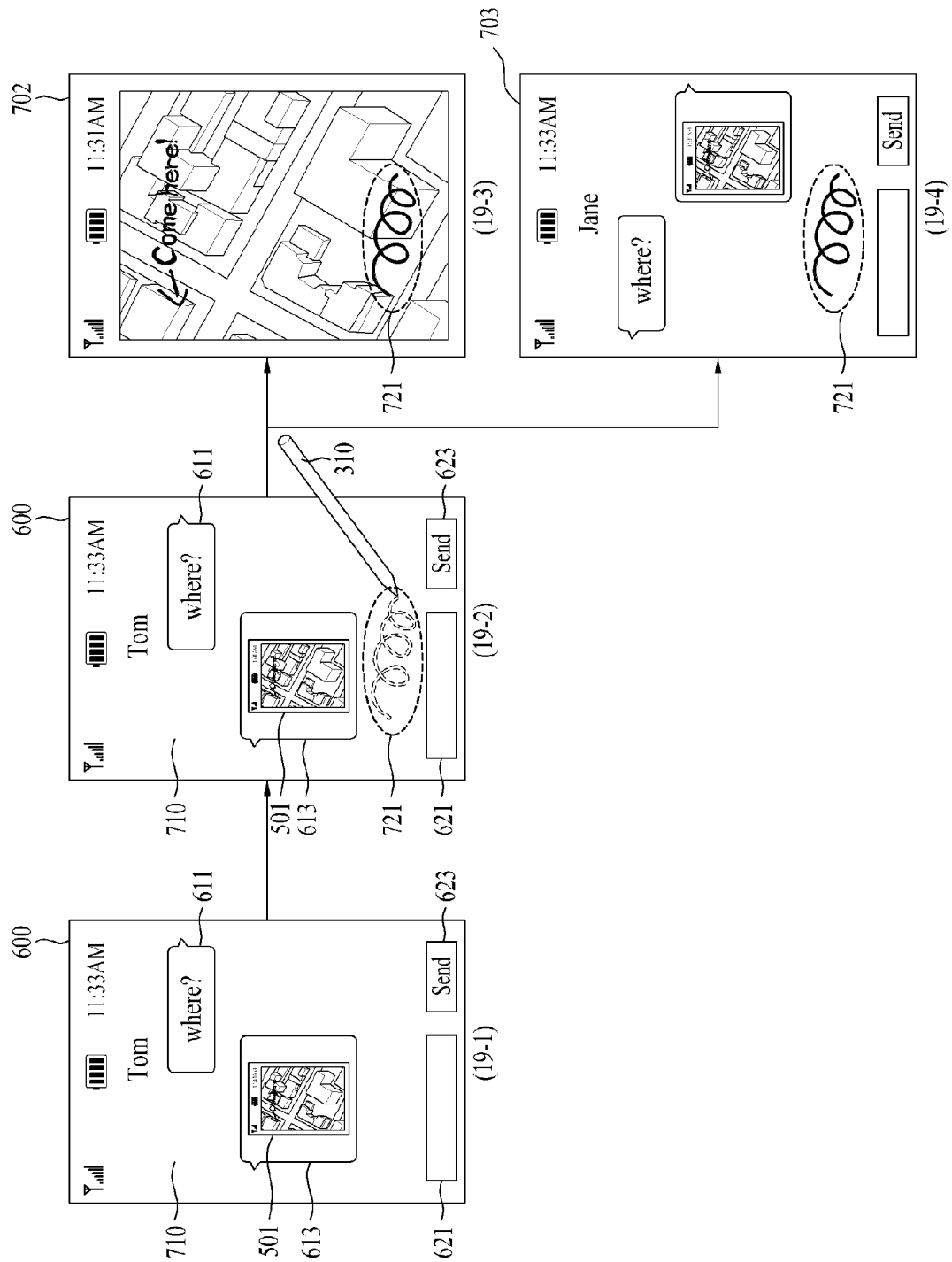
Figure 20:
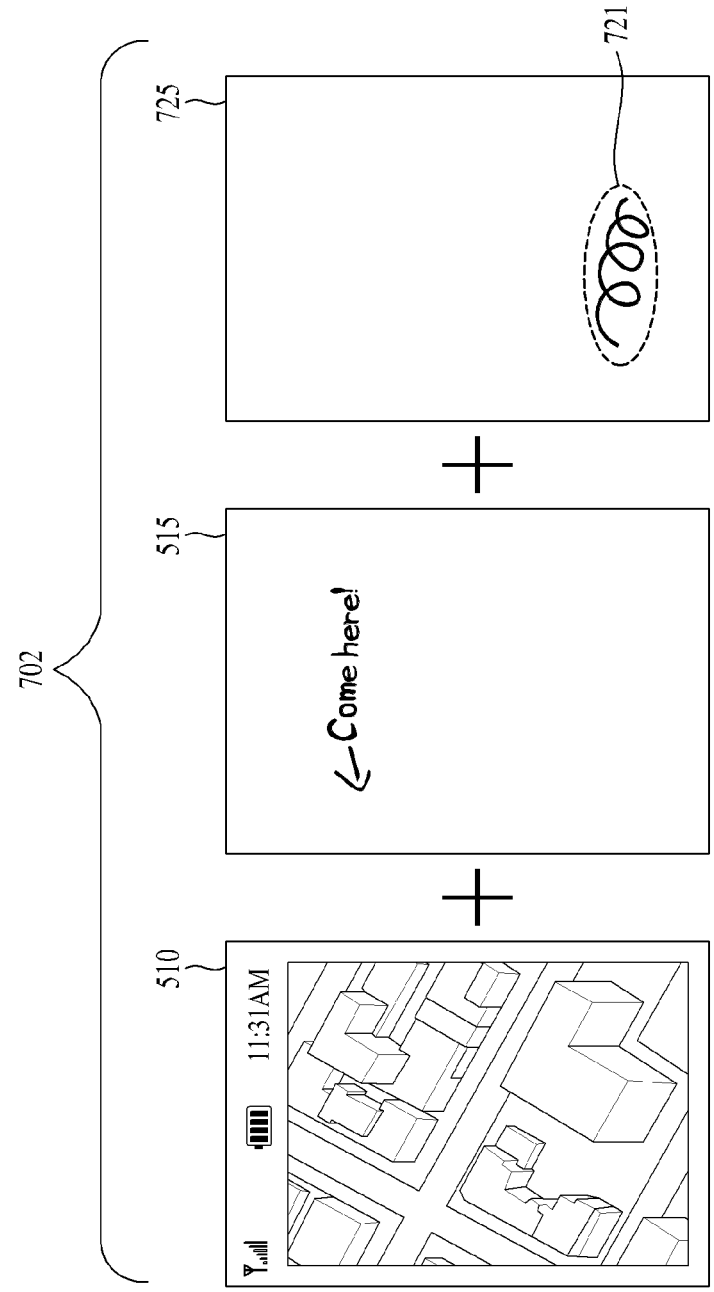
FIG. 20 and FIG. 21 are diagrams of image messages transmitted by a method of controlling a mobile terminal according to an embodiment of the present invention, respectively.
Figure 21:
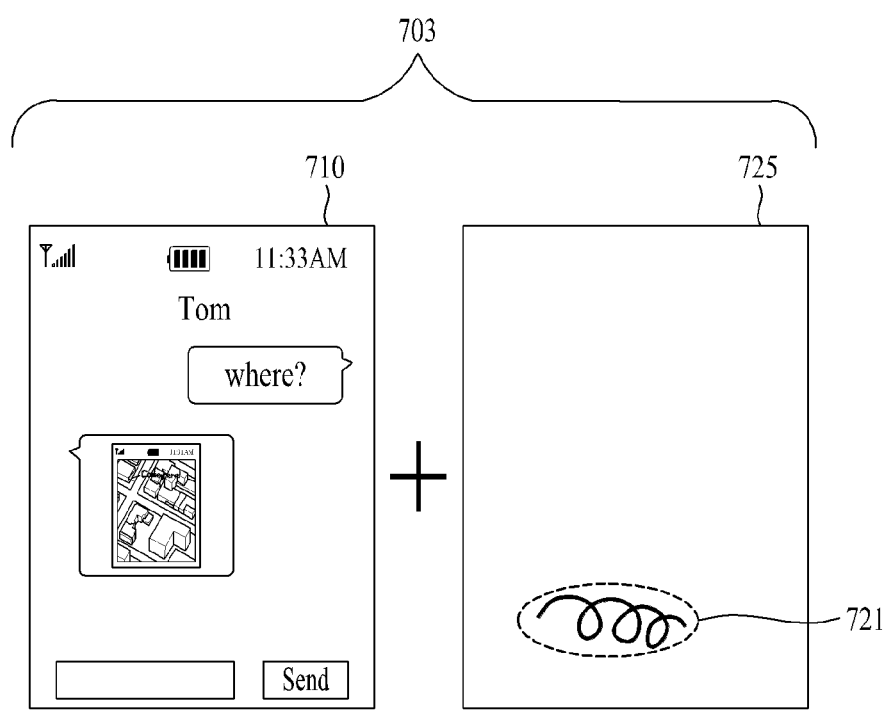

FIG. 19 is a diagram of display screen configurations of implementing a method of controlling a mobile terminal according to an embodiment of the present invention. FIG. 20 and FIG. 21 are diagrams of image messages transmitted by a method of controlling a mobile terminal according to an embodiment of the present invention, respectively.

Referring to FIG. 19 (19-1), the $1^{st}$ image message 501 in the display mode is being displayed as the $1^{st}$ received message 613 on the $2^{nd}$ touchscreen 600. In doing so, the $1^{st}$ received message 613 may be in the display mode without being enlarged.

A $4^{th}$ user command may be inputted to the $2^{nd}$ mobile terminal 100-2. In this case, the $4^{th}$ user command may be performed in a manner of pressing a specific hardware key button of the $2^{nd}$ mobile terminal 100-2 when the $2^{nd}$ user touches the $1^{st}$ image message 501.

If so, the $2^{nd}$ controller 180-2 may control the $1^{st}$ image message 501 to enter the editing mode from the display mode without being enlarged.

Referring to FIG. 19 (19-2), the $2^{nd}$ user may be able to handwrite a desired memo 721 onto the touchscreen 600. Moreover, it may be unnecessary for the desired memo 721 to be written on the $1^{st}$ image message 501 that is not enlarged.

If so, referring to FIG. 19 (19-3), the $2^{nd}$ controller 180 controls a $1^{st}$ screen layer included in the $1^{st}$ image message to become a memo background screen and also controls a new image message 702, on which the desired memo 721 is written, to be created on the memo background screen. In doing so, the $1^{st}$ screen can be understood as entering the editing mode from the display mode if the specific hardware key button is inputted.

Although the desired memo is not written on the $1^{st}$ image message, the $2^{nd}$ controller 180-2 may be able to create a layer of the desired memo for the $1^{st}$ screen layer as if the desired memo is automatically written on the $1^{st}$ screen layer.

FIG. 20 shows the new image message 702 shown in FIG. 19 (19-3) in detail. The new image message 702 may include a $1^{st}$ screen layer 510, a $1^{st}$ memo layer 515 and a layer 725 of the desired memo.

Meanwhile, while the $1^{st}$ received message 613 is in the display mode without being enlarged, a $5^{th}$ user command may be inputted to the $2^{nd}$ mobile terminal 100-2. In particular, the $5^{th}$ user command may be performed in a manner that the $2^{nd}$ user presses the specific hardware key button of the mobile terminal without touching the touchscreen 600.

Subsequently, referring to FIG. 19 (19-2), the $2^{nd}$ user may be able to input the desired memo 721 to the touchscreen 600 by handwriting.

If so, referring to FIG. 19 (19-4), the $2^{nd}$ controller 180 controls a full screen (hereinafter named a $2^{nd}$ screen) of the $2^{nd}$ touchscreen 600, which is provided at the timing point of inputting the specific hardware key button, to become the memo background screen and also controls a new image 703, which includes the memo background screen and the desired memo 721 written thereon. In particular, as the specific hardware key button is inputted, the $2^{nd}$ screen may be understood as entering the editing mode from the display mode instead of the $1^{st}$ screen.

FIG. 21 shows the new image message 703 shown in FIG. 19 (19-4) in detail. Referring to FIG. 21, the new image message 703 may include a $2^{nd}$ screen layer 720 and a layer 725 of the desired memo.

According to the above description, when the specific hardware key button is pressed, either the $1^{st}$ screen or the $2^{nd}$ screen is selected depending on whether a prescribed image message is touched and selected from the $2^{nd}$ touchscreen 600 and the selected screen then becomes the memo background screen, by which the present embodiment may be non-limited. This is described in detail with reference to FIG. 22 as follows.

Figure 22:
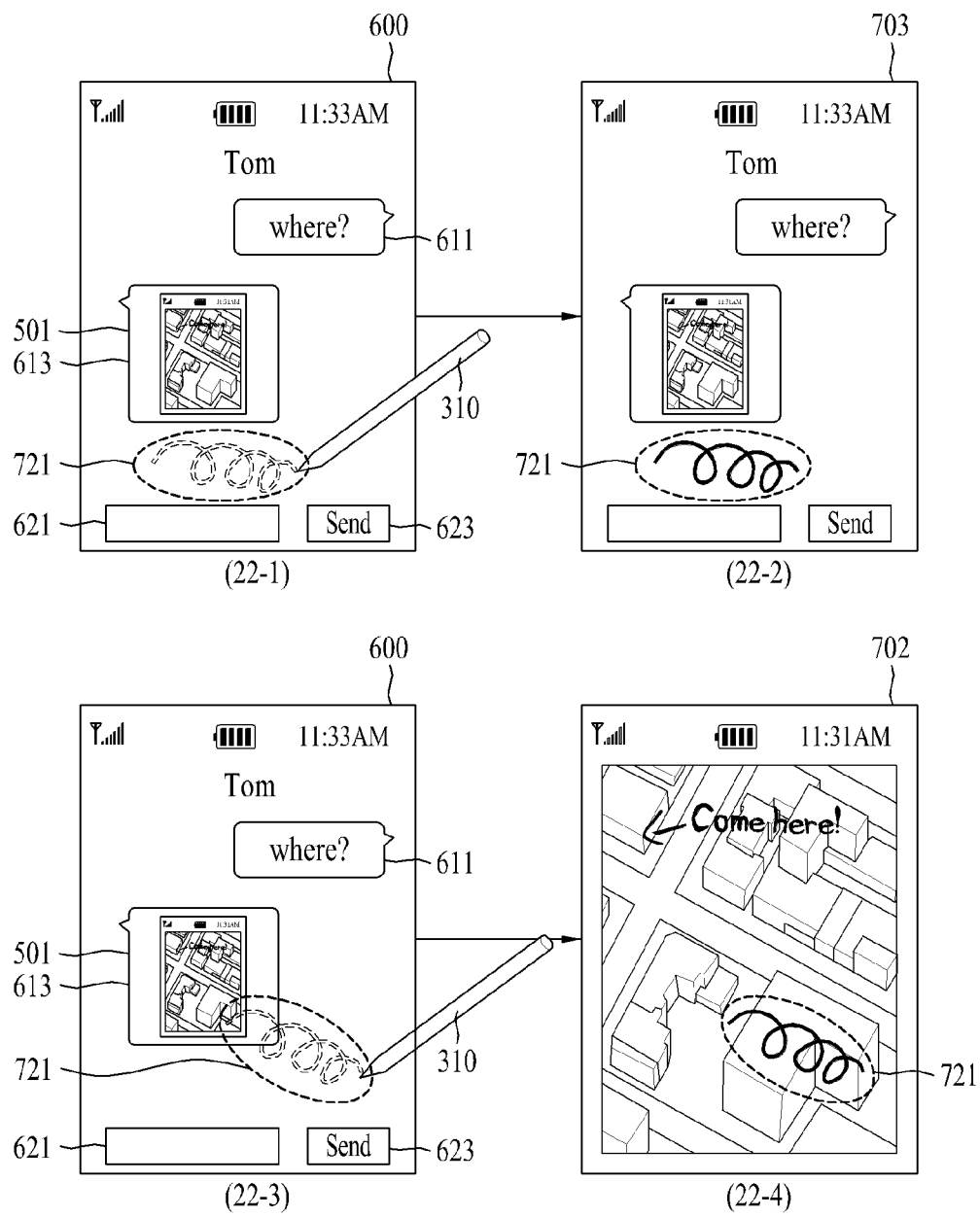
FIGS. 22 to 27 are diagrams of display screen configurations of implementing a method of controlling a mobile terminal according to an embodiment of the present invention.

FIG. 22 is a diagram of display screen configurations of implementing a method of controlling a mobile terminal according to an embodiment of the present invention.

Referring to FIG. 22 (22-1), after the hardware key button has been pressed without a touch to the $2^{nd}$ touchscreen 600, the prescribed memo may start with a position on the $2^{nd}$ touchscreen 600, on which the $1^{st}$ image message 501 does not exist.

If so, referring to FIG. 22 (22-2), the $2^{nd}$ controller 180 may control the $2^{nd}$ screen to become a memo background screen for the new image message 703.

Alternatively, referring to FIG. 22 (22-3), after the hardware key button has been pressed without a touch to the $2^{nd}$ touchscreen 600, the prescribed memo may start with a region on the $1^{st}$ image message of the $2^{nd}$ touchscreen 600.

If so, referring to FIG. 22 (22-4), the $2^{nd}$ controller 180 may control the $1^{st}$ screen to become a memo background screen for the new image message 703.

Besides, if a $4^{th}$ user command is inputted within prescribed duration from the timing point of receiving the $1^{st}$ image message 501, the $1^{st}$ screen may become a memo background screen for the new image message 702 [not shown in the drawing]. Alternatively, if a $4^{th}$ user command is inputted after prescribed duration from the timing point of receiving the $1^{st}$ image message 501, the $2^{nd}$ screen may become a memo background screen for the new image message 702 [not shown in the drawing].

According to the above description, if the mode of the $1^{st}$ image message is switched to the editing mode from the display mode, all handwriting inputted on to the $1^{st}$ image message is performed for the memo. Yet, it may be unnecessary for all the handwriting to be regarded as the memo. This is described in detail with reference to FIG. 23 and FIG. 24 as follows.

Figure 23:
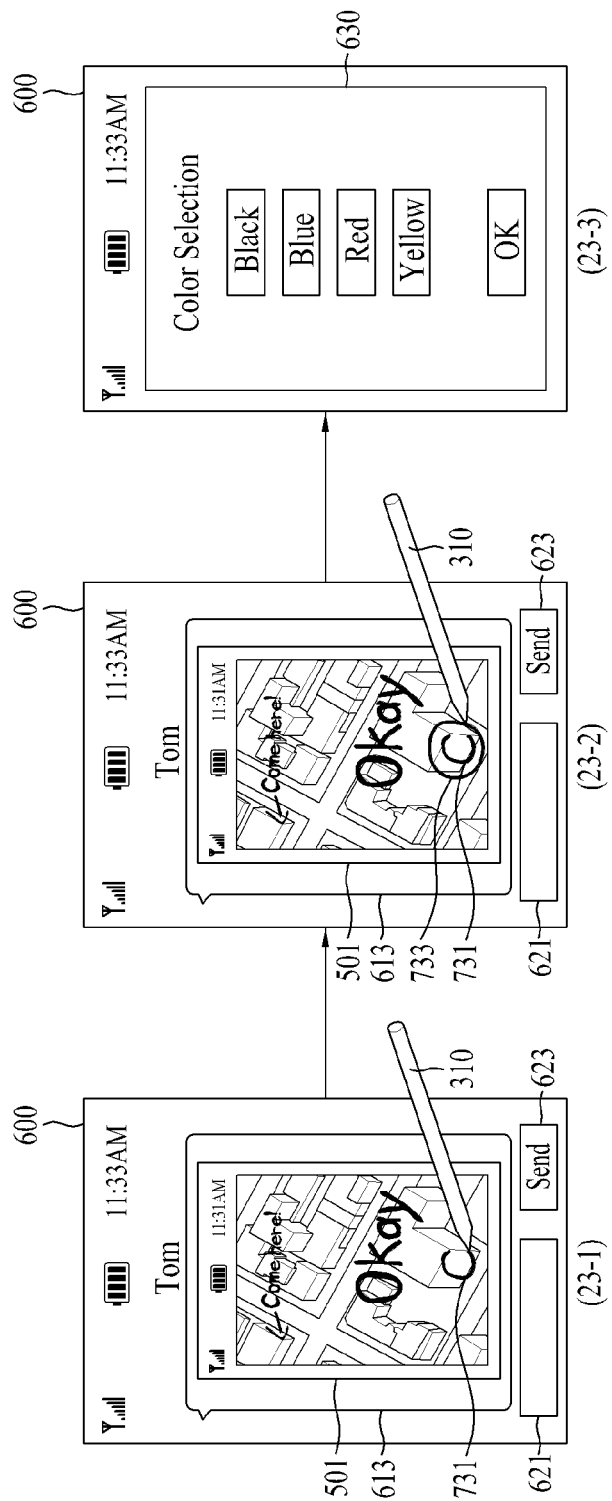
Figure 24:
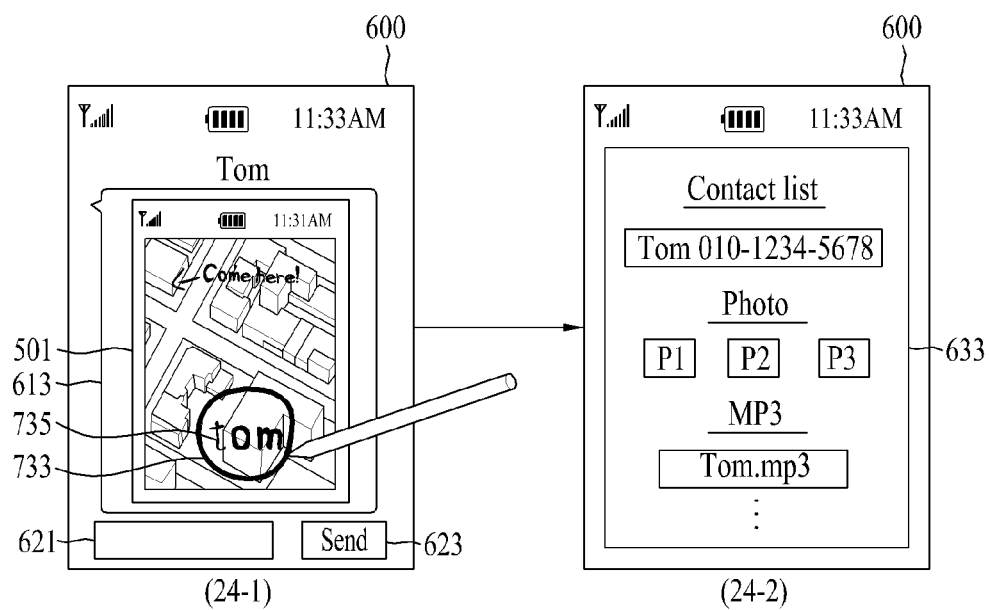

FIG. 23 and FIG. 24 are diagrams of display screen configurations of implementing a method of controlling a mobile terminal according to an embodiment of the present invention.

Referring to FIG. 23 (23-1), the 1st image message 501 displayed on the 2nd touchscreen 600 is in the editing mode. In doing so, a desired handwriting 731 may be inputted.

Referring to FIG. 23 (23-2), after the desired handwriting 731 has been inputted, a handwriting 733 of a preset pattern may be performed on the desired handwriting 731. For instance, the handwriting 733 of the preset pattern for the desired handwriting 731 includes a handwriting of a closed curve pattern that encloses the desired handwriting 731.

Until the handwriting 733 of the preset pattern is additionally inputted, the desired handwriting 731 is the handwriting for the memo. Yet, the 2nd controller 180 may recognize the handwriting 733 of the preset pattern and the desired handwriting 731 additionally applied to the handwriting 733 of the preset pattern as a user command instead of recognizing the handwritings 733 and 731 as the handwritings for the memo.

In particular, the 2nd controller 180 recognizes the trace 'C' of the desired handwriting 731 and may then control a menu, which is previously set for the recognized trace, to be activated.

Referring to FIG. 23 (23-3), for instance, the preset menu includes a menu 630 for selecting a line color of the trace 'C' of the desired handwriting 731, or for selecting a line color for a next trace which will be created along a pointer touch drag after the line color is selected.

Alternatively, although the handwriting 733 of the preset pattern is not inputted in addition, if the handwriting 731 having the preset trace 'C' is inputted to the 1st image message in the editing mode, the 2nd controller 180 may control a menu, which corresponds to the preset trace or the next trace, to be activated in direct.

A process for activating a prescribed menu through a handwriting inputted onto a 1st image message in an editing mode is described in detail with reference to FIG. 24 as follows.

FIG. 24 is a diagram of display screen configurations of implementing a method of controlling a mobile terminal according to an embodiment of the present invention.

Referring to FIG. 24 (24-1), the 1st image message 501 displayed on the 2nd touchscreen 600 is in the editing mode. In doing so, a desired handwriting 735 for inputting a name of a prescribed person may be inputted.

Subsequently, referring to FIG. 24 (24-1), after the desired handwriting 735 has been inputted, a handwriting 733 of a preset pattern may be performed on the desired handwriting 735.

Until the handwriting 733 of the preset pattern is additionally inputted, the desired handwriting 735 is for the memo. Yet, the 2nd controller 180 may recognize the desired handwriting 735 and the handwriting 733 of the preset pattern additionally applied to the desired handwriting 735 as a user command instead of recognizing the handwritings 733 and 735 as the handwritings for the memo.

In particular, the 2nd controller 180 text-recognizes the trace 'Tom' of the desired handwriting 735, which is within the handwriting 733 of the preset pattern, as a counterpart and may then control a menu, which is previously set for the text-recognized counterpart, to be activated.

Referring to FIG. 24 (24-3), for instance, the preset menu includes a menu 633 for searching a 2nd memory 160-2 the 2nd mobile terminal 100-2 for photo files, video files, still image files, music files, message files and the like, which are related to the text-recognized counterpart 'Tom', and then displaying the found files, collectively.

The found contact may be usable to transmit an image message to the found counterpart. And, the found file(s) may be attached to the image message transmitted to the found counterpart.

In the following description, a process for inputting a desired memo onto the 1st image message 501 in the editing mode is explained in detail with reference to FIG. 25.

Figure 25:
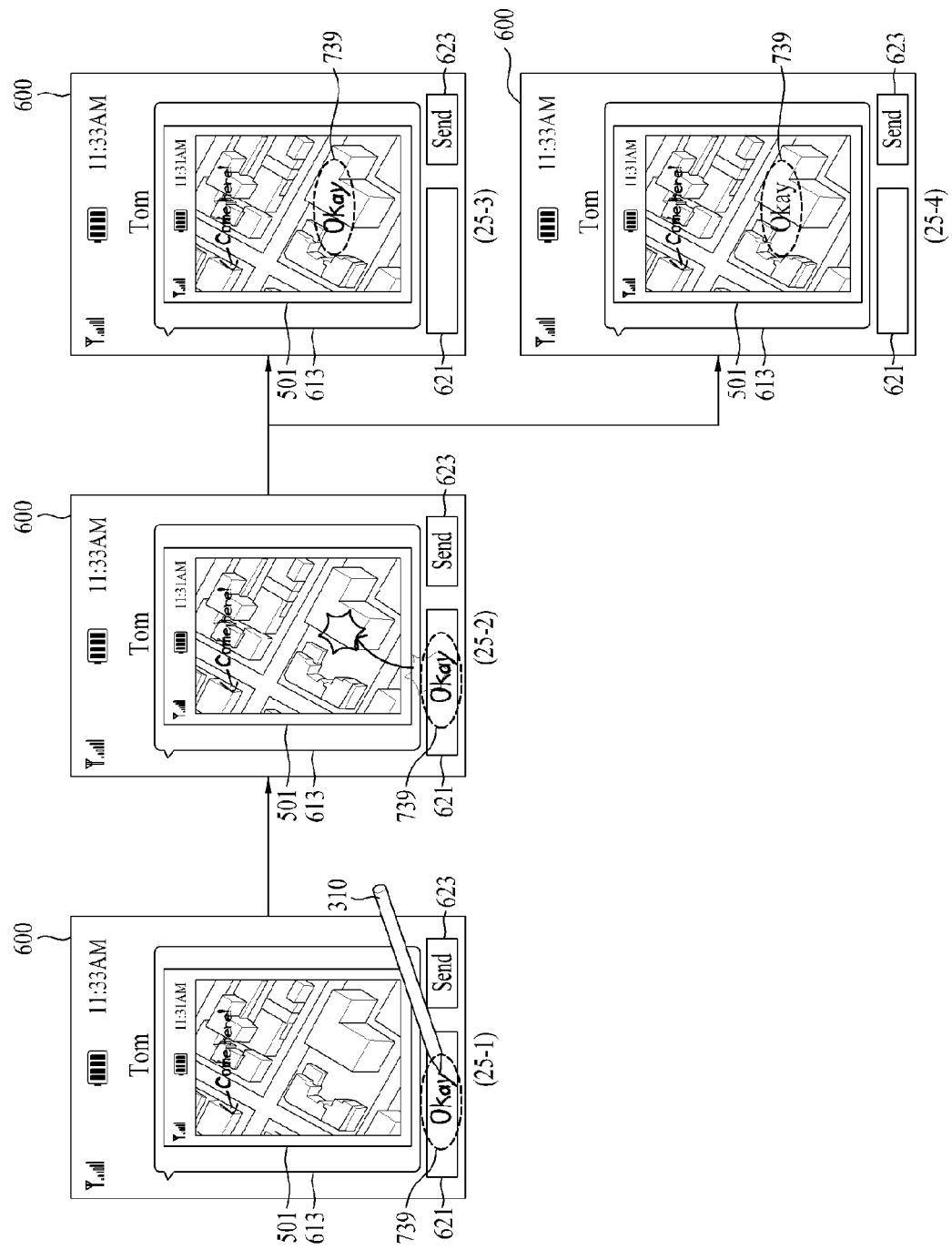

FIG. 25 is a diagram of display screen configurations of implementing a method of controlling a mobile terminal according to an embodiment of the present invention.

Referring to FIG. 25 (25-1), the 1st image message 501 displayed on the 2nd touchscreen 600 is in the editing mode. And, a message input field 621 may be displayed together with the 1st image message 501 in the editing mode.

The 2nd user may be able to input a desired memo 739 to the message input field 621 by handwriting.

Subsequently, referring to FIG. 25 (25-2), the 2nd user may be able to touch and drag the inputted desired memo 739 to a desired position of the 1st image message 501 in the editing mode.

If so, referring to FIG. 25 (25-3), the 2nd controller 180-2 may be able to control the desired memo 739 inputted by handwriting to be shifted to and situated at the desired position of the 1st image message 501. Hence, the 2nd user may be able to easily determine a position, at which the desired memo 739 will be arranged, on the 1st image message 501.

Alternatively, referring to FIG. 25 (25-4), when the desired memo 739 is touched and dragged to the 1st image message 501, the 2nd controller 180-2 text-recognizes the desired handwriting, converts a type of the text-recognized desired memo not to a handwriting type but to a printing type according to a preset font, and then controls the type-converted desired memo 739 to be situated on the 1st image message 501.

Regarding the former description with reference to FIG. 14, the 3rd image message 503 may be transmitted to the 3rd mobile terminal 100-3 from the 1st mobile terminal 10-1. In the following description, the 3rd image message 503 displayed on the 3rd mobile terminal 100-3 is explained in detail with reference to FIG. 26.

Figure 26:
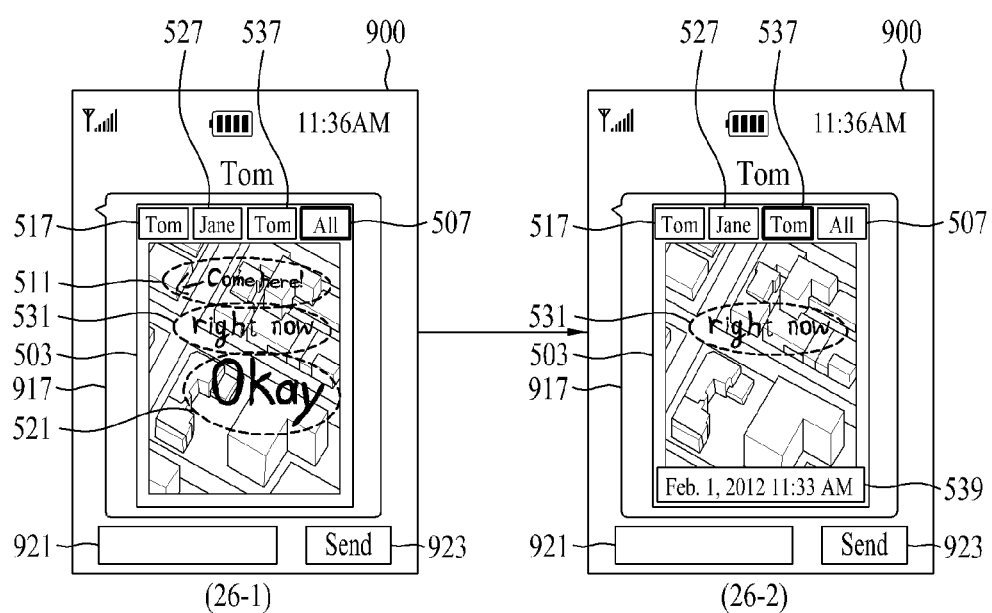

FIG. 26 is a diagram of display screen configurations of implementing a method of controlling a mobile terminal according to an embodiment of the present invention.

Referring to FIG. 26 (26-1), the 3rd image message 503 may be displayed as a 3rd received message 917 on the 3rd touchscreen 900 of the 3rd mobile terminal 100-3. FIG. 26 (26-1) shows one example that the 3rd image message 503 in the display mode or the editing mode is enlarged and displayed on the 3rd touchscreen 900. Yet, as mentioned in the foregoing description, it is a matter of course that the 3rd image message 503 can be displayed together with other transmitted and/or received messages previously saved in the 3rd mobile terminal 100-3.

When the 3rd image message 503 is displayed, the 3rd controller 180-3 may be able to control identifiers 517, 527 and 537 of 1st to 3rd memos 511, 521 and 531 recorded in the 3rd image message 503 to be displayed on the 3rd touchscreen 900 as well. Although FIG. 26 shows one example that the identifiers 517, 527 and 537 are displayed on the 3rd image message 503, the identifiers 517, 527 and 537 may be displayable any place on the 3rd touchscreen 900.

The 1st identifier 517 may correspond to the 1st memo. The 2nd identifier 527 may correspond to the 2nd memo. And, the 3rd identifier may correspond to the 3rd memo.

The 1st to 3rd identifiers 517, 527 and 537 may be enumerated in order of the written time of each of the corresponding memos. The $1^{st}$ to $3^{rd}$ identifiers 517, 527 and 537 may be provided to select the corresponding memos, respectively. FIG. 26 (26-1) shows one example that the $1^{st}$ to $3^{rd}$ identifiers 517, 527 and 537 are represented as names of writers of the corresponding memos, respectively. Alternatively, the $1^{st}$ to $3^{rd}$ identifiers 517, 527 and 537 may be represented as indications (e.g., memo transmitted times, etc.) other than the writer names. Moreover, as mentioned in the foregoing description, each memo layer can be transmitted in a manner of containing a transmitted time information and a mobile terminal (or user) identifier information.

And, a select all icon 'All' 507 for selecting all of the $1^{st}$ to $3^{rd}$ memos 511, 521 and 531 may be displayed together with the $1^{st}$ to $3^{rd}$ identifiers 517, 527 and 537.

FIG. 26 (26-1) shows one example that the select all icon 507 has been selected. Therefore, all the memos are simultaneously displayed on the $3^{rd}$ image message 503.

The $3^{rd}$ user may be able to touch and select the $3^{rd}$ identifier 537 for example.

If so, referring to FIG. 26 (26-2), the $3^{rd}$ controller 180-3 may be able to control the $3^{rd}$ memo 531, which corresponds to the $3^{rd}$ identifier 537, to be displayed on the $3^{rd}$ image message 503 only. Moreover, when the $3^{rd}$ memo 531 is selectively displayed only, the $3^{rd}$ controller 180-3 may be able to control a transmitted time information 539 of the $3^{rd}$ memo 531 to be displayed on the $3^{rd}$ touchscreen 900 together with the $3^{rd}$ memo 531.

Although FIG. 26 (26-2) shows one example that the transmitted time information 539 of the $3^{rd}$ memo 531 is displayed on the $3^{rd}$ image message 503, the transmitted time information 539 may be displayable on any place on the $3^{rd}$ touchscreen 900.

When the $3^{rd}$ identifier 537 is selected, it may be unnecessary for the $3^{rd}$ memo 531 to be displayed only. For instance, while the $1^{st}$ to $3^{rd}$ memos are displayed, the $3^{rd}$ memo 531 may be displayed in a manner of being visually identifiable from the rest of the memos.

Alternatively, after at least two identifiers have been simultaneously selected, at least two memos corresponding to the selected identifiers are displayed only or may be displayed in a manner of being visually identifiable only.

It may be unnecessary for the identifiers to be used only to view a desired one of the $1^{st}$ to $3^{rd}$ memos selectively. This is described in detail with reference to FIG. 27 as follows.

Figure 27:
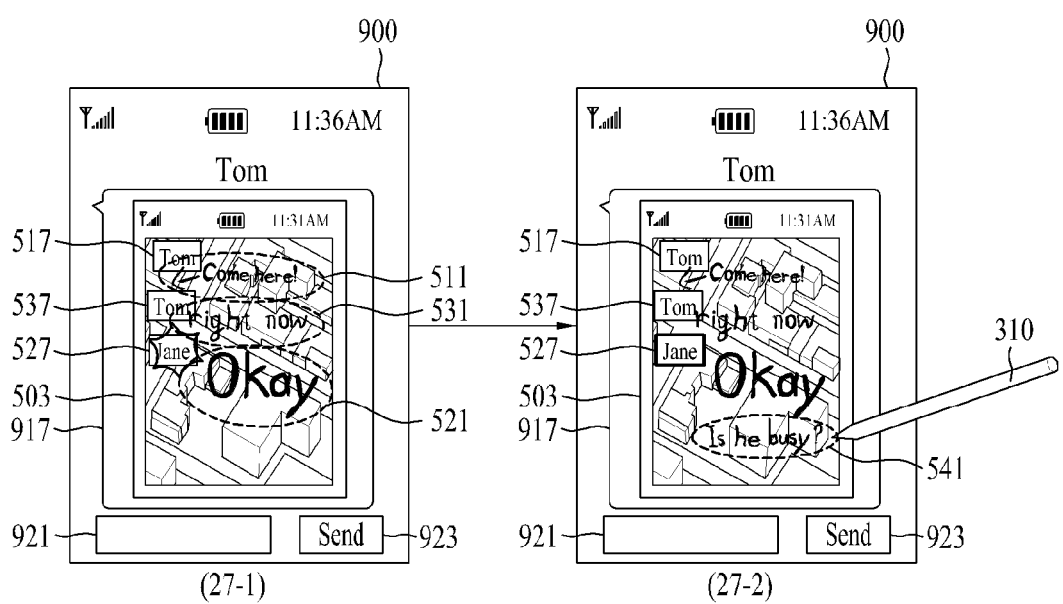

FIG. 27 is a diagram of display screen configurations of implementing a method of controlling a mobile terminal according to an embodiment of the present invention.

Referring to FIG. 27 (27-1), the $3^{rd}$ image 503 may be displayed as a $3^{rd}$ received message 917 on the $3^{rd}$ touchscreen 900 of the $3^{rd}$ mobile terminal 100-3. And, the $1^{st}$ to $3^{rd}$ memos 511, 521 and 531 may be displayed on the $3^{rd}$ image message 503 together with the corresponding identifiers.

In doing so, referring to FIG. 27 (27-2), after the $2^{nd}$ identifier 527 has been touched and selected by the $3^{rd}$ user, a $4^{th}$ memo 541 may be handwritten on the $3^{rd}$ image message 503 in the editing mode. Subsequently, an icon 'Send' 923 may be touched and selected by the $3^{rd}$ user.

In response to the selected $2^{nd}$ identifier 527, the written $4^{th}$ memo 541 and the selected icon 'Send' 923, the $3^{rd}$ controller 180-3 creates a $3^{rd}$ image message (hereinafter named a $4^{th}$ image message 504) having the $4^{th}$ memo 541 written thereon and may be then able to control the $4^{th}$ image message 504 to be transmitted only to the $2^{nd}$ mobile terminal 100-2 corresponding to the $2^{nd}$ identifier 527 (i.e., the $2^{nd}$ mobile terminal in which the $2^{nd}$ memo corresponding to the $2^{nd}$ identifier is written).

A process for the $4^{th}$ image message 504 to be transmitted from the $3^{rd}$ mobile terminal 100-3 to the $2^{nd}$ mobile terminal 100-2 only is described in detail with reference to FIG. 28 as follows.

Figure 28:
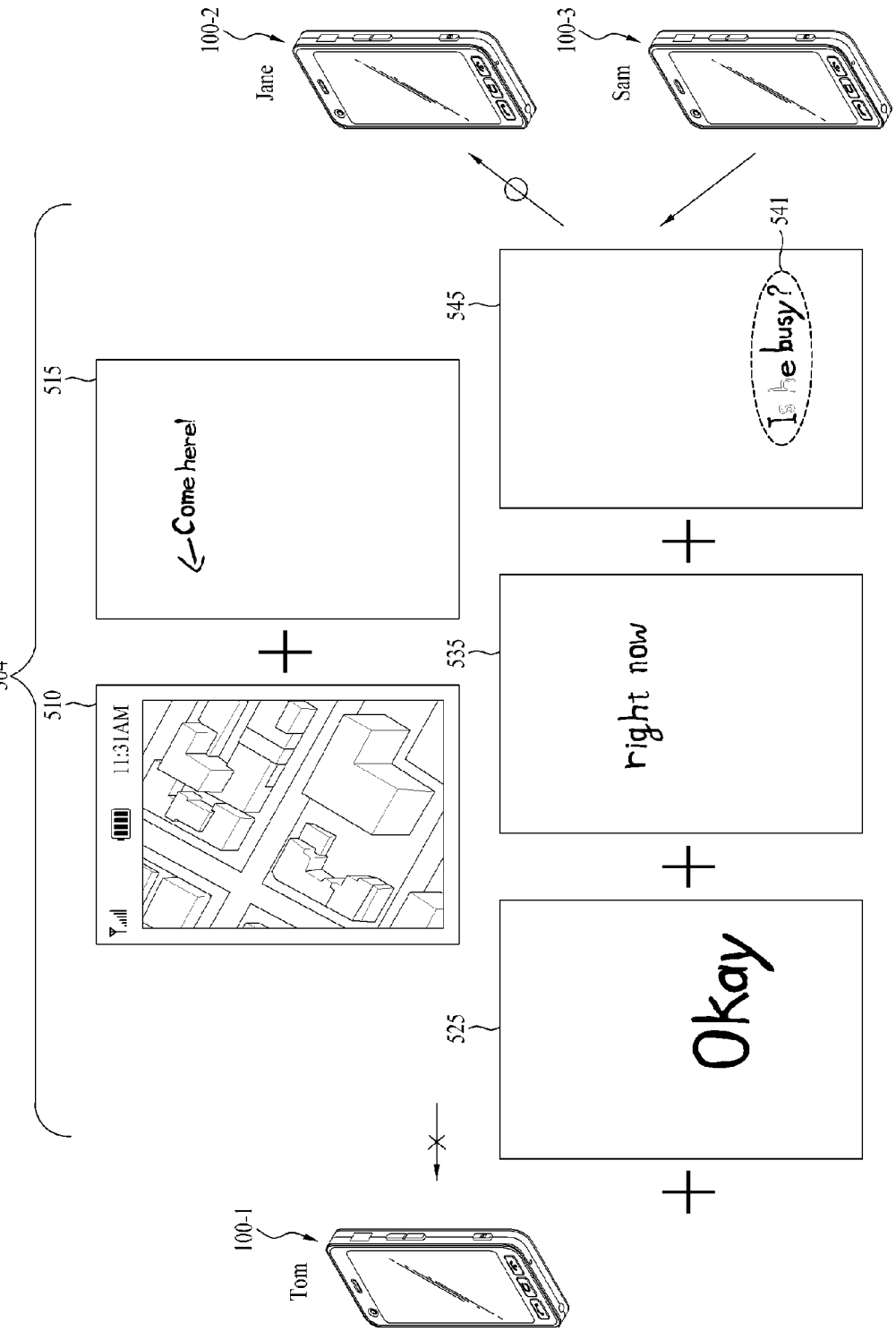
FIG. 28 is a diagram of an image message transmitted by a method of controlling a mobile terminal according to an embodiment of the present invention.

FIG. 28 is a diagram of an image message transmitted by a method of controlling a mobile terminal according to an embodiment of the present invention.

Referring to FIG. 28, the $4^{th}$ image message 504 may include a $1^{st}$ screen layer 510 containing a $1^{st}$ screen (i.e., a memo screen screen), a $1^{st}$ memo layer 515 containing a $1^{st}$ memo 511, a $2^{nd}$ memo layer 525 containing a $2^{nd}$ memo 521, a $3^{rd}$ memo layer 535 containing a $3^{rd}$ memo 531, and a $4^{th}$ memo layer 545 containing a $4^{th}$ memo 541. In particular, the $4^{th}$ memo layer 545 may include at least one of a time of transmitting the $4^{th}$ memo layer 545 and a $3^{rd}$ mobile terminal identifier information (or a $3^{rd}$ user identifier information) on a $3^{rd}$ mobile terminal having the $4^{th}$ memo 541 written therein.

In the following description, when the $3^{rd}$ mobile terminal 100-3 is in a touchscreen locked state or a touchscreen off-state, a process for receiving the $3^{rd}$ image message 503 is explained in detail with reference to FIG. 29.

Figure 29:
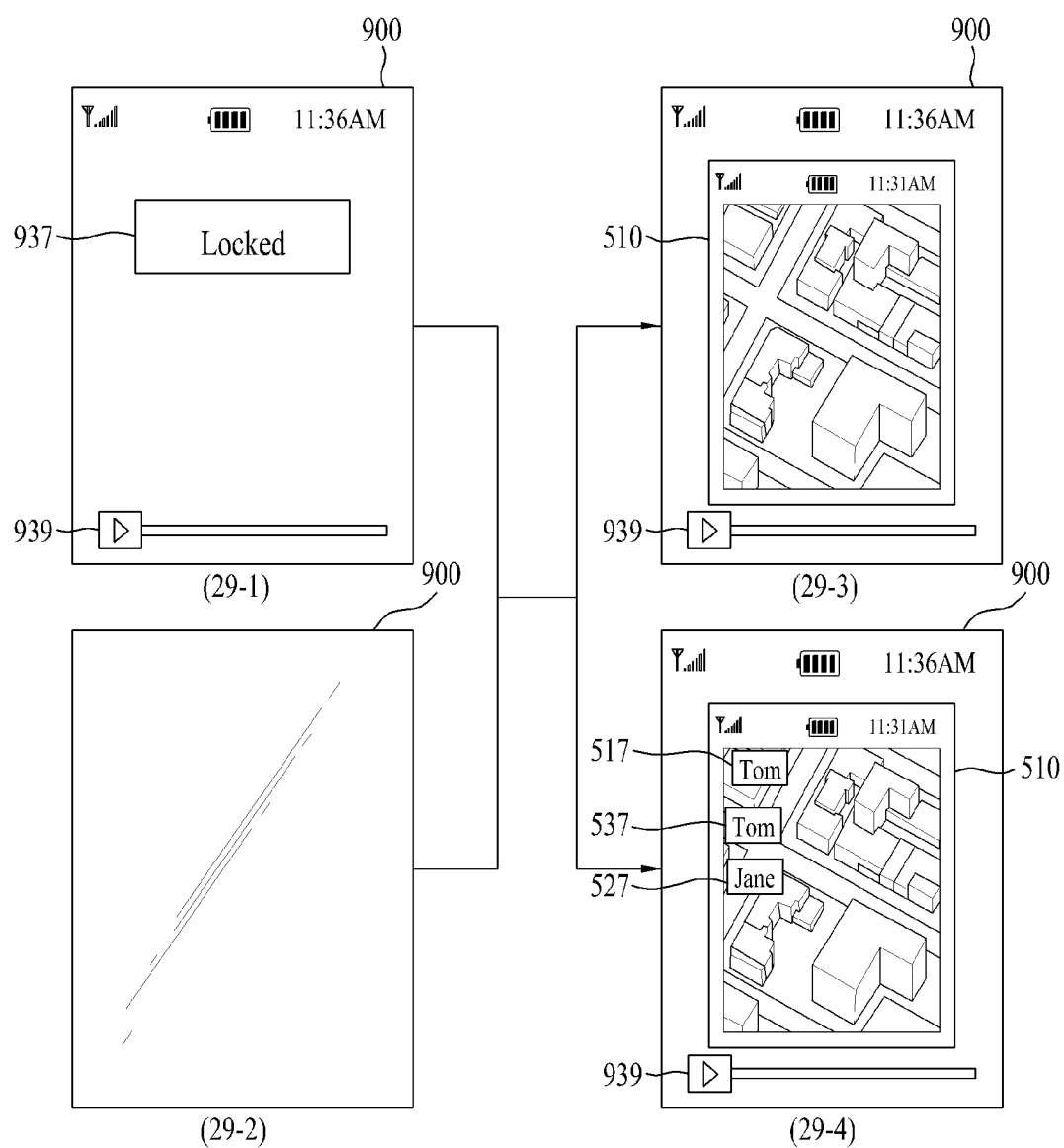
FIGS. 29 to 31 are diagrams of display screen configurations of implementing a method of controlling a mobile terminal according to an embodiment of the present invention.

FIG. 29 is a diagram of display screen configurations of implementing a method of controlling a mobile terminal according to an embodiment of the present invention.

Referring to FIG. 29 (29-1), the $3^{rd}$ mobile terminal 100-3 may be in a touchscreen locked mode. Referring to FIG. 29 (29-2), the $3^{rd}$ mobile terminal 100-3 may be in a touchscreen off-mode.

In this case, the touchscreen locked mode may mean the mode in which a limited preset touch limited can be inputted only in order to prevent an incorrectly manipulated touch to the touchscreen. And, the touchscreen off-mode may mean the mode in which the touchscreen does not output any information by turning off a supply power of the touchscreen to minimize power loss despite that a power of the $3^{rd}$ mobile terminal 100-3 is turned on and in which the touchscreen is unable to receive an input of any touch. Generally, while the mobile terminal 100 is in the touchscreen locked mode, if any user input is not made for prescribed duration, the touchscreen off-mode can be automatically entered.

While the $3^{rd}$ mobile terminal 100-3 is in the touchscreen locked mode, the $3^{rd}$ controller 180-3 may control an unlock icon 939, which is provided to cancel the touchscreen locked mode, to be displayed on the $3^{rd}$ touchscreen 900. If the unlock icon 939 is dragged along a prescribed trace, the $3^{rd}$ controller 180-3 may control the $3^{rd}$ mobile terminal 100-3 to be released from the locked mode.

While the $3^{rd}$ mobile terminal 100-3 is in the touchscreen locked mode or the touchscreen off-mode, it may be able to receive the $3^{rd}$ image message 503.

If so, referring to FIG. 29 (29-3), the $3^{rd}$ controller 180-3 controls the $3^{rd}$ mobile terminal 100-3 to stay in the touchscreen locked mode and may also control the $1^{st}$ screen layer 510 to be displayed on the $3^{rd}$ touchscreen 900 only in a manner that the $1^{st}$ to $3^{rd}$ memo layers in the received $3^{rd}$ image message 503 are not displayed on the $3^{rd}$ touchscreen 900. This is to protect the privacy of the $3^{rd}$ user of the $3^{rd}$ mobile terminal 100-3. If the touchscreen locked mode is cancelled, the $3^{rd}$ controller 180-3 may be able to control the $1^{st}$ to $3^{rd}$ memo layers to be displayed in a manner of overlapping with the $3^{rd}$ image message.

Alternatively, referring to FIG. 29 (29-4), the $3^{rd}$ controller 180-3 controls the $3^{rd}$ mobile terminal 100-3 to stay in the touchscreen locked mode and may also control the identifiers 517, 527 and 537 of the 1st to 3rd memos to be displayed on the 1st screen layer 510 by displaying the 1st screen layer 510 on the 3rd touchscreen 900 only in a manner that the 1st to 3rd memo layers in the received 3rd image message 503 are not displayed on the 3rd touchscreen 900. If the touchscreen locked mode is cancelled, the 3rd controller 180-3 may control the 1st to 3rd memo layers to be displayed together with the identifiers in a manner of overlapping with the 3rd image message.

In the following description, when the 3rd mobile terminal 100-3 is in the touchscreen locked state or the touchscreen off-state, a process for receiving the 3rd image message 503 is explained in detail with reference to FIG. 30.

Figure 30:
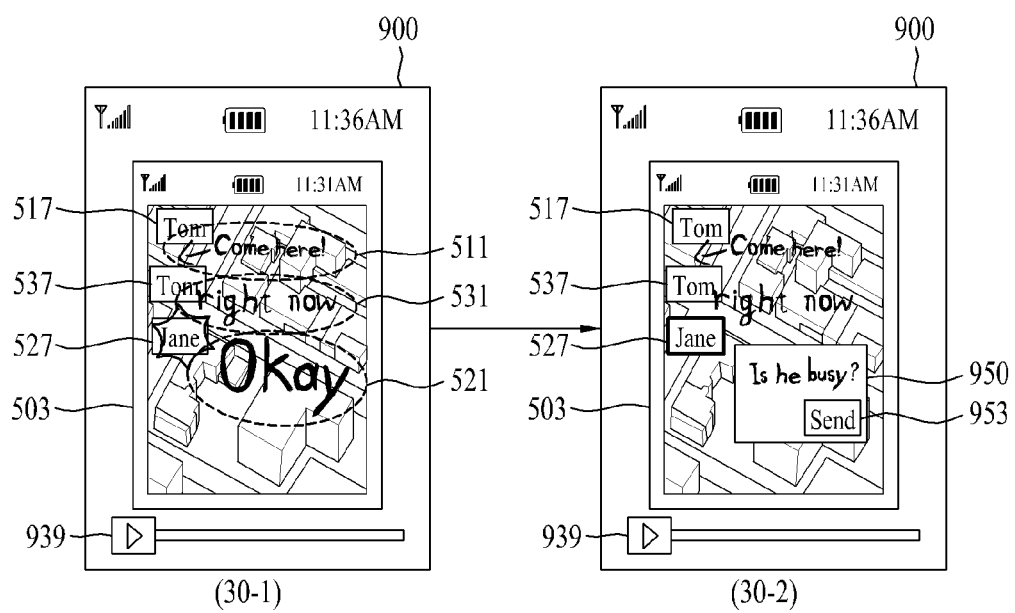

FIG. 30 is a diagram of display screen configurations of implementing a method of controlling a mobile terminal according to an embodiment of the present invention.

Referring to FIG. 30 (30-1), when the 3rd mobile terminal 100-3 is in the touchscreen locked state or the touchscreen off-state, if the 3rd mobile terminal 100-3 receives the 3rd image message 503, the 3rd controller 180-3 may control the mobile terminal 100-3 to stay in the touchscreen locked state and may also control the 3rd image message 503 to be displayed as a portion of the touchscreen locked screen on the 3rd touchscreen 900.

And, referring to FIG. 30 (30-1), the 3rd controller 180-3 may be able to control the 1st to 3rd identifiers 517, 527 and 537, which correspond to the 1st to 3rd memos 511, 521 and 531, respectively, to be displayed on the 3rd image message 503.

In doing so, a 6th user command for selecting one (e.g., the 2nd identifier) of the 1st 3rd identifiers may be inputted. In this case, the 6th user command may include a long touch to the 2nd identifier 527, by which the present embodiment may be non-limited.

If so, referring to FIG. 30 (30-2), the 3rd controller 180-3 may be able to control a message writing window 950, which is provided to write a message to be transmitted to the 2nd mobile terminal (or the 2nd user) corresponding to the 2nd identifier, to be displayed in response to the 6th user command.

Subsequently, the 3rd user writes a desired memo on the message writing window 950 by handwriting and may be then able to touch and select an icon 'Send' 953.

If so, the 3rd controller 180-3 may be able to control the written memo to be transmitted to the 2nd mobile terminal 100-2 only.

Figure 31:
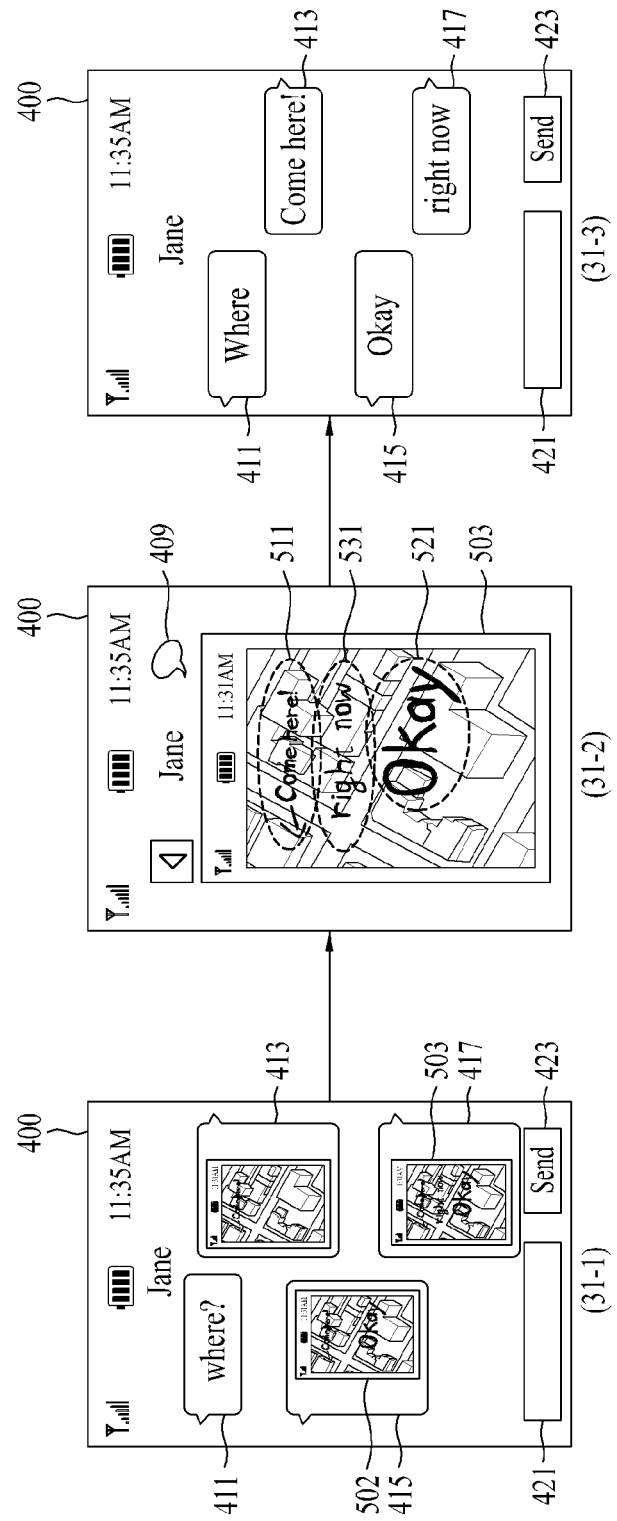

FIG. 31 is a diagram of display screen configurations of implementing a method of controlling a mobile terminal according to an embodiment of the present invention.

Referring to FIG. 31 (31-1), after the 1st mobile terminal 100-1 has transmitted the 3rd image message 503, the 3rd image message 503 may be displayed as a 3rd transmitted message 417 on a chat window for a chat with the 2nd user.

Thereafter, a 3rd user command may be inputted to enlarge and display the 3rd transmitted message 417.

If so, referring to FIG. 31 (31-2), the 1st controller 180-1 may be able to control the 3rd transmitted message 417 to be displayed by being enlarged. And, the 1st controller 180-1 may be able to control a text message convert icon 409 to be displayed with the enlarged 3rd transmitted message 417.

If the 1st user touches and selects the text message convert icon 409, referring to FIG. 31 (31-3), the 1st controller 180-1 converts the 1st to 3rd memos 511, 521 and 531 in the 3rd image message 503 to text messages and may then control the text messages to be displayed as the 1st transmitted message 413, the 2nd received message 415 and the 3rd transmitted message 417 on the chat window, respectively.

Optionally, the 1st transmitted message 413, the 2nd received message 415 and the 3rd transmitted message 417 may be displayed in a manner of being sorted or arranged on the chat window in order of the corresponding transmitted or received time.

Accordingly, embodiments of the present invention provide various effects and/or features.

According to at least one of embodiments of the present invention, a user unfamiliar with key buttons is able to conveniently perform a communication with a counterpart through messages.

In particular, even if a user does not press a key button, a message communication with a counterpart can be performed in a manner that the user handwrites and sends a memo to the counterpart. In the course of the ongoing message communication, the user writes a memo on an image received from the counterpart and then sends the written memo back to the counterpart.

And, in the course of the ongoing message communication, the user is able to conveniently view a memo written image from the counterpart. Moreover, in the course of the ongoing message communication, the user further writes his memo on the image having a memo written thereon by the counterpart and is then able to transmit the corresponding memo to the counterpart.

It will be apparent to those skilled in the art that the present invention can be specified into other form(s) without departing from the spirit or scope of the inventions.

According to the above descriptions, images messages are transceived among 1st to 3rd mobile terminals. Since a prescribed embodiment related to one of the mobile terminals is apparently applicable to the rest of the mobile terminals, the repetitive contents shall be omitted from the present specification. In particular, embodiments related to the 1st mobile terminal are applicable to the 2nd or 3rd mobile terminal, embodiments related to the 2nd mobile terminal are applicable to the 1st or 3rd mobile terminal, and embodiments related to the 3rd mobile terminal are applicable to the 1st or 2nd mobile terminal.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touchscreen;
   a wireless communication unit configured to perform a wireless communication with at least one or more external terminals including a 1st external terminal; and
   a controller configured to:
   display a 1st image message including an image received from the 1st external terminal on the touchscreen together with at least one of a previously saved transmitted message and a previously saved received message,
in response to a $1^{st}$ user command inputted in the course of displaying the $1^{st}$ image message, control a $1^{st}$ memo to be written on the image of the received $1^{st}$ image message,
in response to reception of a $2^{nd}$ user command, control a $2^{nd}$ image message including the image having the $1^{st}$ memo written thereon to be transmitted to the $1^{st}$ external terminal, wherein the $2^{nd}$ image message comprises an image layer including the received image and a $1^{st}$ memo layer including the $1^{st}$ memo,
transmit the image layer and the $1^{st}$ memo layer as the $2^{nd}$ image message to the $1^{st}$ external terminal,
receive a $3^{rd}$ image message comprising the image layer, the $1^{st}$ memo layer and a $2^{nd}$ memo layer created by the $1^{st}$ external terminal from the $1^{st}$ external terminal,
display the image layer, the $1^{st}$ memo layer and the $2^{nd}$ memo layer as the $3^{rd}$ image message on the touchscreen in a manner of overlapping with each other, and
in response to the $1^{st}$ user command inputted in the course of displaying the $3^{rd}$ image message, control a $3^{rd}$ memo to be written on the $3^{rd}$ image message,
wherein if the $1^{st}$ user command is inputted within a first prescribed duration after reception of the $3^{rd}$ image message, the controller controls a $2^{nd}$ memo included in the $2^{nd}$ memo layer only to be displayed on the image in the course of writing the $3^{rd}$ memo,
wherein if the $1^{st}$ user command is inputted after the first prescribed duration from a time of the reception of the $3^{rd}$ image message, the controller controls both of the $1^{st}$ memo and the $2^{nd}$ memo to be displayed on the image in the course of writing the $3^{rd}$ memo, and
wherein if the $2^{nd}$ user command is inputted, the controller controls the $3^{rd}$ image message, which comprises the image, the $1^{st}$ memo layer, the $2^{nd}$ memo layer and a $3^{rd}$ memo layer, to be transmitted to the $1^{st}$ external terminal irrespective of whether the $1^{st}$ memo is displayed.

2. The mobile terminal of claim 1, wherein the controller controls both of the $1^{st}$ image message and the $2^{nd}$ image message to be displayed together after the $2^{nd}$ image message has been transmitted.

3. The mobile terminal of claim 2, wherein while the received image is in a display mode, the controller controls the received image to be displayed on the touchscreen together with at least one of a previously saved transmitted message and a previously saved received message, and
wherein while the received image is in an editing mode, the controller controls the $1^{st}$ memo to be written on the received image.

4. The mobile terminal of claim 3, wherein if a touch gesture is performed on the received image in the display mode, the controller controls the received image to enter the editing mode from the display mode by being enlarged.

5. The mobile terminal of claim 3, wherein if a touch gesture is performed on the touchscreen with a pointer having a $1^{st}$ thickness, the controller controls the received image to stay in the display mode, and
wherein if the touch gesture is performed on the touchscreen with the pointer having a $2^{nd}$ thickness, the controller controls the received image to enter the editing mode from the display mode.

6. The mobile terminal of claim 3, wherein the controller controls one selected by a user between the received image and a full screen of the touchscreen to enter the editing mode, and
wherein if the full screen enters the editing mode, the controller controls the $1^{st}$ memo to be written on an image of the full screen.

7. The mobile terminal of claim 3, wherein after the received image has entered the editing mode, the controller controls a $1^{st}$ user handwriting to be inputted onto the touchscreen, and
wherein after the $1^{st}$ user handwriting has been inputted, if a previously set $2^{nd}$ user handwriting is inputted, the controller controls the $1^{st}$ user handwriting to be recognized as a user command for activating a prescribed menu corresponding to the $1^{st}$ user handwriting.

8. The mobile terminal of claim 3, wherein after the received image has entered the editing mode, the controller controls a $1^{st}$ handwriting to be inputted onto the touchscreen, and
wherein if a trace of the $1^{st}$ user handwriting is a preset trace, the controller controls the $1^{st}$ user handwriting to be recognized as a user command for activating a prescribed menu corresponding to the $1^{st}$ user handwriting.

9. The mobile terminal of claim 6, further comprising at least one of hardware and software key buttons, wherein after the received image has been selected, if the key button is pressed, the controller controls the received image to enter the editing mode and wherein if the key button is pressed without selecting the received image, the controller controls the full screen to enter the editing mode.

10. The mobile terminal of claim 6, wherein after the $1^{st}$ user command has been inputted, if a user handwriting for writing the $1^{st}$ memo starts with a region on the received image, the controller controls the received image to enter the editing mode, and
wherein after the $1^{st}$ user command has been inputted, if the user handwriting for writing the $1^{st}$ memo starts with a region other than the received image, the controller controls the full screen to enter the editing mode.

11. The mobile terminal of claim 6, wherein if the $1^{st}$ user command is inputted within a second prescribed duration after reception of the $1^{st}$ image message, the controller controls the received image to enter the editing mode, and
wherein if the $1^{st}$ user command is inputted after the second prescribed duration from a time of the reception of the $1^{st}$ image message, the controller controls the full screen to enter the editing mode.

12. The mobile terminal of claim 2, wherein when the $2^{nd}$ user command is inputted, the controller further controls a $4^{th}$ image message including the $1^{st}$ memo written image of the full screen to be transmitted to the $1^{st}$ external terminal.

13. The mobile terminal of claim 1, wherein each of the $1^{st}$ memo layer and the $2^{nd}$ memo layer includes information on its corresponding creation time, and
wherein if a prescribed time expires from the corresponding creation time, the controller controls each of the $1^{st}$ memo layer and the $2^{nd}$ memo layer to gradually or instantly disappear from the touchscreen.

14. The mobile terminal of claim 1, wherein when a number of memo layers cumulated on the image layer is equal to or greater than a predetermined number, the controller controls an oldest memo layer among the memo layers to disappear from the touchscreen gradually or instantly.

15. The mobile terminal of claim 1, wherein the $1^{st}$ image message comprises a $4^{th}$ memo layer including a $4^{th}$ memo previously created by a $2^{nd}$ external terminal when the $1^{st}$ image message is received by the mobile terminal,
- wherein after the $2^{nd}$ memo has been selected, if the $3^{rd}$ memo is written, when the $2^{nd}$ user command is inputted, the controller controls a $4^{th}$ image message comprising the image layer and the $1^{st}$ to $4^{th}$ memo layers to be transmitted to the $1^{st}$ external terminal, and
- wherein after the $4^{th}$ memo has been selected, if the $3^{rd}$ memo is written, when the $2^{nd}$ user command is inputted, the controller controls the $4^{th}$ image message to be transmitted to the $2^{nd}$ external terminal.

16. A method of controlling a mobile terminal, the method comprising:
- performing a wireless communication with at least one or more external terminals including a $1^{st}$ external terminal;
- displaying a $1^{st}$ image message including an image received from the $1^{st}$ external terminal on a touchscreen together with at least one of a previously saved transmitted message and a previously saved received message;
- in response to a $1^{st}$ user command inputted in the course of displaying the $1^{st}$ image message, controlling a $1^{st}$ memo to be written on the image of the received $1^{st}$ image message;
- in response to reception of a $2^{nd}$ user command, controlling a $2^{nd}$ image message including the image having the $1^{st}$ memo written thereon to be transmitted to the $1^{st}$ external terminal, wherein the $2^{nd}$ image message comprises an image layer including the received image and a $1^{st}$ memo layer including the $1^{st}$ memo;
- transmitting the image layer and the $1^{st}$ memo layer as the $2^{nd}$ image message to the $1^{st}$ external terminal;
- receiving a $3^{rd}$ image message comprising the image layer, the $1^{st}$ memo layer and a $2^{nd}$ memo layer created by the $1^{st}$ external terminal from the $1^{st}$ external terminal;
- displaying the image layer, the $1^{st}$ memo layer and the $2^{nd}$ memo layer as the $3^{rd}$ image message on the touchscreen in a manner of overlapping with each other; and
- in response to the $1^{st}$ user command inputted in the course of displaying the $3^{rd}$ image message, controlling a $3^{rd}$ memo to be written on the $3^{rd}$ image message, wherein the method further comprises:
- if the $1^{st}$ user command is inputted within a prescribed duration after reception of the $3^{rd}$ image message, controlling a $2^{nd}$ memo included in the $2^{nd}$ memo layer only to be displayed on the image in the course of writing the $3^{rd}$ memo;
- if the $1^{st}$ user command is inputted after the prescribed duration from a time of the reception of the $3^{rd}$ image message, controlling both of the $1^{st}$ memo and the $2^{nd}$ memo to be displayed on the image in the course of writing the $3^{rd}$ memo; and
- if the $2^{nd}$ user command is inputted, the controller controls the $3^{rd}$ image message, which comprises the image, the $1^{st}$ memo layer, the $2^{nd}$ memo layer and a $3^{rd}$ memo layer, to be transmitted to the $1^{st}$ external terminal irrespective of whether the $1^{st}$ memo is displayed.

* * * * *